(12) United States Patent
Phelan et al.

(10) Patent No.: US 11,378,718 B2
(45) Date of Patent: Jul. 5, 2022

(54) UNMANNED AERIAL VEHICLE SYSTEM AND METHODS

(71) Applicants: Robert S. Phelan, Haymarket, VA (US); Joshua Shane Nicoll, McKinney, TX (US)

(72) Inventors: Robert S. Phelan, Haymarket, VA (US); Joshua Shane Nicoll, McKinney, TX (US)

( * ) Notice: Subject to any disclaimer, the term of this patent is extended or adjusted under 35 U.S.C. 154(b) by 56 days.

(21) Appl. No.: 16/591,593

(22) Filed: Oct. 2, 2019

(65) Prior Publication Data

US 2020/0103552 A1 Apr. 2, 2020

Related U.S. Application Data

(60) Provisional application No. 62/743,763, filed on Oct. 10, 2018, provisional application No. 62/743,370, (Continued)

(51) Int. Cl.
*G01W 1/06* (2006.01)
*G01W 1/10* (2006.01)
(Continued)

(52) U.S. Cl.
CPC ............... *G01W 1/06* (2013.01); *G01S 13/95* (2013.01); *G01W 1/10* (2013.01); *G05D 1/1062* (2019.05); *G01S 7/414* (2013.01); *G01S 13/951* (2013.01); *G01S 13/953* (2013.01); *G01S 13/958* (2013.01); *G01W 1/14* (2013.01);
(Continued)

(58) Field of Classification Search
CPC . G01W 1/06; G01W 1/10; G01W 1/14; G01S 13/95; G01S 13/951; G01S 13/958; G01S 13/953; G01S 7/414; G05D 1/1062; Y02A 90/10; G08G 5/0086; G08G 5/003; G08G 5/0069; G08G 5/006
See application file for complete search history.

(56) References Cited

U.S. PATENT DOCUMENTS

| 8,346,578 B1 * | 1/2013 | Hopkins, III | G06Q 50/16 |
| | | | 705/4 |
| 9,881,213 B2 * | 1/2018 | Michini | B64C 39/024 |

(Continued)

OTHER PUBLICATIONS

Cintinteo et al. "An Objective High-Resolution Hail Climatology of the Contiguous United States", Cooperative Institute for Mesoscale Meteorological Studies, University of Oklahoma, and National Severe Storms Laboratory, Norman, Oklahoma, Oct. 2012 (Year: 2012).*

(Continued)

*Primary Examiner* — Daniel R Miller
*Assistant Examiner* — Christian T Bryant
(74) *Attorney, Agent, or Firm* — Charles S. Sara; Elizabeth L. Neal; DeWitt LLP

(57) ABSTRACT

The present invention is a method and system for generating an area of interest for unmanned aerial vehicle (UAV) missions. Using radar and weather data, a mission area may be generated for flights which will maximize efficiency by pre-generating flight paths based on atmospheric and other data. The UAV may include artificial intelligence (AI) capabilities for processing imaging and other sensed data. Post-processing of the data may include additional AI training and processing.

20 Claims, 4 Drawing Sheets

Related U.S. Application Data filed on Oct. 9, 2018, provisional application No. 62/740,383, filed on Oct. 2, 2018.

(51) Int. Cl.
| | |
|---|---|
| *G01S 13/95* | (2006.01) |
| *G05D 1/10* | (2006.01) |
| *G01S 7/41* | (2006.01) |
| *G08G 5/00* | (2006.01) |
| *G01W 1/14* | (2006.01) |

(52) U.S. Cl.
CPC .............. *G08G 5/003* (2013.01); *G08G 5/006* (2013.01); *G08G 5/0069* (2013.01); *G08G 5/0086* (2013.01); *Y02A 90/10* (2018.01)

(56) References Cited

U.S. PATENT DOCUMENTS

| | | | |
|---|---|---|---|
| 9,959,771 B1* | 5/2018 | Carlson | G08G 5/0039 |
| 2009/0243918 A1* | 10/2009 | Kelly | G01W 1/04 |
| | | | 342/26 R |
| 2014/0018979 A1* | 1/2014 | Goossen | G05D 1/0044 |
| | | | 701/3 |
| 2016/0307447 A1* | 10/2016 | Johnson | B60L 58/12 |
| 2018/0211115 A1* | 7/2018 | Klein | G06K 9/0063 |
| 2018/0218524 A1* | 8/2018 | Abalharth | G01C 11/04 |
| 2018/0247544 A1* | 8/2018 | Mustafic | G08G 5/0039 |

OTHER PUBLICATIONS

International Preliminary Report on Patentability dated Mar. 31, 2021, from the U.S. Receiving Office.

\* cited by examiner

UNMANNED AERIAL VEHICLE SYSTEM AND METHODS

CROSS-REFERENCE TO RELATED APPLICATIONS

This application claims priority to U.S. Provisional Applications No. 62/740,383, filed Oct. 2, 2018, 62/743,370, filed Oct. 9, 2018, and 62/743,767, filed Oct. 10, 2018, the contents of which are incorporated by reference in their entirety.

BACKGROUND

This invention relates to a method and system for using an unmanned aerial vehicle to evaluate large areas and provide data on various characteristics of these areas.

Storm damage from hail and high winds is difficult to evaluate. Certain damaged portions of buildings, such as roofs, may be out of direct view of the ground. Climbing ladders to examine each roof is time-consuming, tiring, and may bring some physical risk. Conversely, flying above the roofline allows for easy examination, but suffers from inaccuracy and cost, as a plane may be too quick-moving and far above the ground to gain an accurate reading while a helicopter is slow and expensive to operate. The advent of unmanned aerial vehicles (UAVs) provides an easy, inexpensive means for examining rooftops and other areas, but conventional UAVs lack mission planning capabilities, making deployment haphazard and inefficient. The UAVs lack the ability to process the sensor data on board, limiting their endurance in the field.

There is an unmet need in the art for a method of targeting particular areas for UAV deployment and for a UAV capable of processing sensor data on board.

SUMMARY

An exemplary embodiment of the present application is a method for generating a storm estimate, comprising retrieving raw weather data from a radar source, the raw weather data having a high resolution, obtaining a maximum estimate size of hail (MESH) from the raw weather data, correlating a MESH above a given threshold with a radar geographical location and a time span, retrieving at least one radar weather data pixel within a given hail radius of the radar geographical location and the given time span, filtering the at least one radar weather data pixel to remove noise and clutter, retrieving atmospheric level data for the locations of atmospheric temperatures of 0° C. and −20° C. for the at least one radar weather data pixel at given intervals during the time span, calculating at least one new MESH using the atmospheric level data and the at least one radar weather data pixel; and correlating the at least one new MESH with a hail geographical location corresponding to the at least one radar weather data pixel.

The above method may further comprise creating an overlay of the at least one new MESH on a map corresponding to the hail geographical location, wherein the overlay is in the form of a hail polygon corresponding to the at least one radar weather data pixel.

The above method may further comprise designating at least one hail polygon having at least one new MESH above a given threshold as a mission area for at least one unmanned aerial vehicle (UAV).

The above method may further comprise correlating polygons having at least one new MESH above a given threshold with a database of customer locations.

The above method may further comprise the at least one radar weather data pixel being filtered to remove storm reflectivity of under 35 dBZ.

The above method may further comprise a method for wind correction, comprising acquiring wind velocity data for at least one radar weather data pixel, filtering out any wind velocity data below at least one given wind threshold, calculating a wind distance between the at least one radar weather data pixel and the radar geographical location, calculating a beam height and a beam azimuth of a radar beam emanating from the radar geographical location at the at least one radar weather data pixel, calculating at least one wind velocity and at least one wind direction from a radar wind speed and a radar wind direction, wherein the component of the radar beam in the radar wind direction and the height of the radar beam are used to calculate the at least one wind velocity and at least one wind direction, and correlating the at least one wind velocity and at least one wind direction with a wind geographical location corresponding to the at least one radar weather data pixel.

The above method may further comprise creating an overlay of the at least one wind velocity and at least one wind direction on a map corresponding to the wind geographical location.

The above method may further comprise the overlay being in the form of a wind polygon corresponding to the at least one radar weather data pixel.

The above method may further comprise designating at least one wind polygon having at least one wind velocity and at least one wind direction above a given threshold as a mission area for at least one UAV.

Another embodiment of the present application is a system for generating a storm estimate, comprising a processor and a non-transitory computer readable medium programmed with computer readable code that upon execution by the processor causes the processor to execute the above method for generating a storm estimate.

The above system may also comprise at least one database containing the map and the at least one new MESH.

The above system may also comprise at least one user interface operably connected to the at least one database and receiving the overlay of the at least one new MESH on the map, the at least one user interface operably and controllably connected to at least one UAV, the at least one UAV having at least one UAV sensor connected thereto.

The above system may also comprise a graphical user interface (GUI) displayed on the user interface, the GUI displaying at least one user-editable flight path for the at least one UAV or a plurality of user-selectable flight paths for the at least one UAV.

The above system may also comprise each user-selectable flight path comprising at least one of a two-dimensional flight path at a given altitude or a three-dimensional flight path at a plurality of altitudes.

The above system may also comprise the plurality of user-selectable flight paths traversing the at least one hail polygon without overlapping.

The above system may also comprise the GUI further comprising at least one user-selectable sensor profile comprising at least one sensor setting selected from the group consisting of: sensor in use, sensor orientation, and sensor recording interval.

The above system may also comprise the GUI further comprising at least one user-selectable UAV operating height.

The above system may also comprise at least one sensor data file comprising at least one reading taken by the at least one UAV sensor while the UAV travels along the at least one user-editable flight path or one of the plurality of user-selectable flight paths.

The above system may also comprise the at least one sensor file further comprising at least one coordinate record in the sensor file or in the sensor file metadata, wherein the coordinate record is based on the orientation of the at least one UAV sensor and the location of the UAV when the sensor record was made.

The above system may also comprise a sensor database containing a plurality of sensor data files.

The above system may also comprise each of the plurality of sensor data files being correlated to a specific sensor geographical location on the map based on at least one coordinate record in the sensor file or in the sensor file metadata.

The above system may also comprise the non-transitory computer readable medium being programmed with computer readable code that upon execution by the processor causes the processor to execute a file tagging method comprising comparing each of the plurality of sensor data files to at least one tag criterion and updating the sensor file metadata with a tag if the at least one tag criterion is met.

The above system may also comprise a plurality of ground control points (GCPs) being detectable by the at least one UAV sensor, wherein each GCP is correlated with a quasi-unique GCP geographical location.

DETAILED DESCRIPTION

I. Overview

Storm and Wind Processing

Figure 1A:
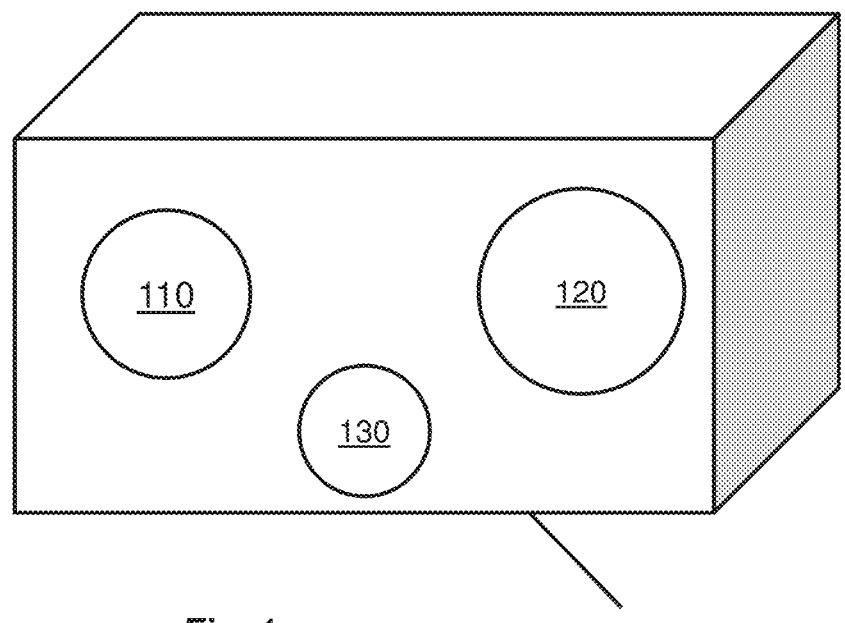
FIGS. 1a through 1f illustrate exemplary embodiments of an imaging body.

The first stage in the process utilizes publicly or privately available weather data, such as, but not limited to, the CONUS-wide (Continental United States) Multi-Radar Multi-Sensor (MRMS) data. MRMS is a nationwide dataset produced by the National Oceanic and Atmospheric Administration (NOAA) that merges all Next Generation Weather Radar (NEXRAD). Locations of storms are determined from evaluating the MRMS data. MRMS data is used to generate a search area, then utilizes the high-resolution NEXRAD station data made available by NOAA to acquire the information that matches the corresponding MRMS time and area. This is used to calculate a maximum estimated size of hail (MESH). This model creates analyses and forecasts of atmospheric conditions across the CONUS.

The NEXRAD velocity values only show winds along the radar beam, requiring comparison against another dataset (from NOAA) to calibrate the wind speed and direction. This involves several trigonometric functions (e.g., sine and cosine), along with other normalizing functions, to generate an estimate which is then filtered to remove noise.

Storm and Wind Results

Once the data is processed, a user such as a disaster response manager can view/visualize all potential storm damage information as polygons on a map. The user may then go verify that polygons intersect with a high incidence of these highly populated areas based on demographics, satellite photos, or pre-selected areas of interest, and to verify that the MESH locations within the system match up with the areas that need to be flown. This will allow Unmanned Aerial Vehicle (UAV) operators to only fly areas/tasks within the area of interest. With this information, the user can then trim down, clean up, delete or adjust areas to fit the needed area of interest or disaster area. Once complete, the user selects or sends those directly to the field through automation, using a UAV application.

The UAV Area Analysis Assessment System uses methods and processes that automate and semi-automate capturing of assessment data. The UAVs carry imaging systems which can capture data using many types of sensors. A targeted area of interest is included, and the UAV positions itself above the area/task, thus allowing the imaging system to capture a nadir (straight down, or 90 degree) angle or any other angled image of the area of interest. The UAV may follow a boustrophedon/serpentine pattern and may capture images or collect non-image scan information. Upon data capture completion, data may then be saved. As part of this system, a UAV operator can fly different altitudes and fly using different patterns depending on the area of interest. The UAV operator also may specify or use different camera or sensor systems depending on mission requirements. It should be understood that any reference to cameras or image files/photographs may equally refer to any type of UAV-mounted sensor or data files obtained therefrom.

Onboard Chip/Computer Vision Configurations

This feature recognition system utilizes computer vision technology while a UAV is flying. This system will scan and recognize potential features and their extents in real time. Once the system finds a feature/building extent, the system may create a subset of areas or regions within a field of view (FOV). Within this subset area, the system can look for damage or patterns in real time. The method may also be able to mark or annotate these locations with text directly in a 2D or 3D environment. Lastly, the system may be able to show measurements such as, but not limited to, distances and coordinates visually, using commonly recognized indicia, patterns, or linear features.

The computer vision unit, and any other sensory unit, may be hot-swappable and interchangeable. As discussed above, this unit can be swapped out for a different configuration or a unit with different capabilities as needed. This swapping may be needed depending on the UAV mission parameters or needs of the area/task. In effect, the sensory unit detached from the UAV structure and replaced with another unit that is more suitable for the UAV mission.

This swappable ability may also be utilized for the Artificial Intelligence (AI) onboard system. The onboard system will be an electronic control unit (ECU). This ECU will have all the components for the AI onboard built and embedded into a single unit. This ECU type of board can be hot-swapped, or interchanged as needed depending on UAV mission, AI needs, or available upgrades.

UAV Network/Mesh Uploading/Downloading

Bluetooth, Wi-Fi, IPs and many types of other networks are amongst the list of systems or ways utilized to transfer data remotely to connect with a UAV, UAV application, SD Cards, AWS, S3, and other emerging technologies. A connection of one or more networks to a server are available for a UAV operator/system. By way of non-limiting example, the UAV can use a primary interface to transmit images to the server. Additionally, a secondary network such as a local wireless network connection may be used by UAV to connect to the user. Passing of information from the first to the second element is enabled by a gateway created by features such as the UAV, server and operator client which are directly connected to each other. The server may also have a standard flight plan saved on it. Based on the information entered by the user into the operation client interface, the data may be altered by the mission flight plan on loading on the UAV through the onboard or cloud processors.

Measurements and Onboard 2D/3D Stitching and Registration

A detailed CAD model is generated through a common 3D intelligence platform. These platforms use photogrammetry methods to build a 2D/3D environment from input data. This is done by detection of roof structures, classification of edge types, accurate extraction of geometry, and measurement of the entire roof. The automated measurements include the lengths of each roof edge and the pitch area for each roof plane. Computerized measurements may be calculated by rounding off to the nearest centimeter. Manual or engineering measurements may be rounded off to the nearest ¼ inch. The standard industrial measurement is measured to the nearest inch. Photogrammetry uses the same principle as that of the human eyes or 3D videos. This allows for objects to be seen and measured in 3D and to establish depth perception. The generation of points or lines with measurements and location detail using automated photogrammetric methods may not be as accurate as manually engineering, but close and is dependent on the camera sensor, quality and quantity of Ground Control points. This processing may take place on the UAV as real-time or batch processing.

This onboard system may include hardware chips, AI enabled chips, graphics processing unit (GPU) tensor core chips, inertial measurement units (IMUs), sensors, solid-state drives, and solid-state Light Detection and Ranging (LiDAR). This onboard system may also include software to run specific hardware routines, AI with deep learning processes, and algorithms. The system can pull saved libraries from a cloud environment that may be utilized in localized UAV project. There are multiple options to build an AI system capable of generating 2D/3D models and performing feature recognition.

In certain embodiments, UAV systems are equipped with vision and onboard systems. Vision systems may fuse together one or more of the following sensors: Vision (Optical) Sensor, Sonar, Infrared, LiDAR, and Radar to enhance computer vision. An on-board computer may include a microprocessor, microcontroller, logical circuits, and/or any other processing circuitry known in the art. A particular purpose processing device such as application-specific integrated circuit (ASIC), a programmable array logic (PAL), a programmable logic array (PLA), a programmable logic device (PLD), a complex programmable logic device (CPLD), a field programmable gate array (FPGA), or other custom-made or computing device may be included in the processor. A computer-readable storage device such as, but not limited to, a non-expansive memory, fixed RAM, ROM, CD-ROM, disk, tape, magnetic memory, optical memory, or another computer-readable storage medium may be included in the onboard computer.

AI Deep learning & Processing, Onboard and Cloud

In one modeling embodiment, the AI deep learning model utilizes a convolutional neural network (CNN) to detect features of interest within UAV acquired aerial imagery. The model is trained with thousands of pre-labeled images which allows the model to learn useful representations of the input data. A trained model's weights (i.e., the specifications of how a model alters its input data to learn patterns) can be saved and used to make predictions on new data. In one embodiment, the model is fed thousands of pre-labeled image tiles (i.e., small, ordered subsets of a larger image) as training samples so that patterns and shapes making up features of interest can be learned. The model then classifies new image tiles into meaningful classes (e.g., damaged shingles, rooftop, or any other useful classification) based on the saved weights from previous training.

Pixel-to-Pattern Post Processing

In another modeling embodiment, once a UAV mission is completed, the data is analyzed, and once the results are available, another AI system may start to analyze all storm AI results within a given area. These systems may perform multiple analyses such as, but not limited to, looking for areas that had multiple events or areas just adjacent to each other or an area of interest nearby. These results may be utilized to create a rating system that rates the areas, based on frequency of damage, level of damage, type of damage, neighborhood age, or any other metric that would be useful for the area. It may also show the tendency for an area to experience a particular type of weather.

Marketing and Sale of Data

The ability to scan areas of interest using the AI recognition system allows evaluation of hail and wind losses, storm damage, age of roofs, and/or area of interest damage as a whole. That data may be broken up and subdivided by individual home, neighborhood, grid, super grid area, county, state, and/or federal boundaries. This data may be sold and/or resold to insurance companies, contractors, manufacturers, distributors, governments, HOAs, real estate brokers, research companies, consumers, home owners, or any other interested parties. The data may be sold directly, or in an alternate embodiment, a use may purchase access to any of the above via an access subscription.

II. Storm Processing

The first step in the process reads high-resolution raw weather data, such as, but not limited to, the CONUS-wide Multi-Radar Multi-Sensor (MRMS) data. MRMS is a nationwide dataset produced by NOAA that merges all CONUS NEXRAD radars onto a uniform 1 km×1 km grid every 2 min to produce several blended radar products. It should be understood that all references to specific radar sources may encompass any radar source capable of providing that same or a similar quality, type, and/or quantity of data. Information is available at each 1 km×1 km pixel. One of the products of MRMS is maximum estimated size of hail (MESH), which may range from 0 to around 5+ inches. The process reads the MESH information, which is geographically referenced, and pulls all MESH pixels that have a MESH value higher than a given threshold, such as, but not limited to, 0.59 inches. The process then compares the location data from the MRMS MESH against an internal dataset (that stores all available 140+ CONUS NEXRAD stations). In certain embodiments, the internal dataset only tracks or uses the percentage of those 140+ NEXRAD radars that are in an area of interest. If one of the tracked NEXRAD radar stations falls within a given radius of the MESH value greater than the given threshold, this station and time stamp are added to the processing queue. This queue only stores stations that need to be processed for the time of interest because it passes the first test of having a MESH greater than the given threshold.

As the storms are processed by station, the process requires the temperature information at two elevations above the ground in the vicinity of the storms. This includes the heights where the temperature reaches 0° and −20° Celsius. This information is used to assess the hail melting and growth regions, which is critical in estimating the size of the hail within thunderstorms. This is used with radar data which provides higher resolution than the MRMS dataset, such as, but not limited to, NEXRAD data.

Providers such as NOAA upload all of their historic and real-time NEXRAD radar data to Amazon Web Services (AWS), which is part of the NOAA Big Data Product. They do this because the size and volume of their data is immense, and this allows easier access to the data by all users. AWS is a cloud-based repository that is used to store data in a cheap and efficient way.

Once all the locations of storms are determined from evaluating the MRMS MESH data, the high-resolution/raw NEXRAD radar data is pulled/downloaded from AWS. This is done because the MRMS data (1 km×1 km) is coarser than the individual NEXRAD station data (i.e., it isn't as accurate as desired). The difference between the MRMS and NEXRAD data is that the NEXRAD data are much finer granularity, especially within 200 km of the radar. For example, at 100 km the NEXRAD pixel is 250 m×1 km, and at 200 km it is 250 m×2 km (still having the volume of an MRMS pixel). Thus, the MRMS data are used to generate a search area, then the process uses the high-resolution NEXRAD station data to acquire the information that matches the corresponding MRMS time and area. This is used to calculate a new MESH.

With the higher resolution NEXRAD data, temperature data is retrieved from the Rapid Refresh (RAP) data. This model creates analyses and forecasts of atmospheric conditions across the CONUS. The analyses used are those that have temperature and elevation information at daily and hourly intervals. This temperature information is input into the MESH algorithm to calculate the new MESH.

Once all the NEXRAD station data has been obtained, the process filters out potential radar noise and/or areas that are not of interest. First, data is only necessary from the strongest parts of the storm where hail would be of concern, and thus only use the storm reflectivity/power that is above a certain threshold, such as, but not limited to, 35 dBZ (this basically gets rid of the blues and greens that one usually sees on a TV or Internet radar display). Second, the process uses the dual-polarization properties of the radar to filter out/remove pixels that likely are associated with non-weather information (e.g., the so-called clutter that doesn't represent storms). These two filters allow retention of the main part of the storm while eliminating information that potentially could make erroneous hail estimates. Additionally, the process has the ability to filter out areas that doesn't hit a certain size of hail based on the new MESH calculation.

Once an output of the process is obtained at each pixel, which are contained in polygons, these polygons are merged together into a seamless overlayer. This layer may be stored directly in a database, which then is ingested into a system so that users (or the system) can then display those polygons on a map. Users can then look for high-impact areas (i.e., with high density hail polygons or high MESH values) that may have targets of interest. If the hail is in an area that is of no interest, such as, but not limited to, open water, then there is no reason to process this storm area.

The process looks at storms that occur in real-time, usually within 5 to 10 minutes. In these situations, the MRMS data is fetched and then added to a system queue for those areas that need to be processed. All the individual scans that need to be processed within the queue may be only a few scans, or they may be several hundred to thousand depending on how many storms are occurring. The time for a storm to make it through the queue to process all the data may actually take from an hour to a few days.

A sample process for storm processing would include the following steps:

Step 101: The common data processing flow looks like the following. Every few minutes the data-loader application downloads the temperature and MRMS files and send it to a proprietary bucket in order to be able to get access to these files on demand. When the files uploading will be finished these files will be added to the processing queue. At this time the storm-processor application takes these files from the queue in chronological order and start the first part of a data processing which is intended to define the list of radars affected by storm. At the end of this data processing step the storm processor create a set of jobs (known as process-worker application) which will process the concrete storm slice (also known as scan) from the concrete NEXRAD radar. When this data processing step will be finished the process-worker application load the processing result into the database for the further usages.

Step 102: Download NOAA Nationwide Multi-Radar Multi-Sensor (MRMS) 1 km×1 km resolution 2-minute data to gather hail locations that have MESH values greater than 0.59 inches of hail.

Step 103: Spatially compare MRMS locations to NOAA NEXRAD stations within 60 miles that are currently tracked or processed.

Step 104: All data is downloaded and stored in a proprietary bucket.

Step 105: In general, all the system can be presented as a distributed software system which consists of a set of applications worked independently from each other integrated into one cluster. If talking about the stack of technologies used in the software system it will look like following: Python (with a set of scientific libraries), C# (based on .Net Core 2), Kubernetes, Amazon AWS and SQL Server/PostgreSQL RDBMSs.

Step 106: Download NEXRAD station data from Amazon Web Services (AWS) public repository and pull the full (i.e., vertical) storm scan information for stations that are near the MRMS threshold value.

Step 107: Download Rapid Refresh (RAP) model temperature and pressure information for the current storm scan from the NOAA server.

Step 108: Copy all related RAP data to the local system for processing.

Step 109: Added to second queue. The second queue is presented as a list of Kubernetes jobs produced by a storm-processor application which should be executed in order to get the result data (such as reflectivity image, reflectivity polygons, the second image created from a set of polygons).

Step 110: Filter out data by thresholds for reflectivity and the correlation coefficient. In one embodiment, these filters are above 30 dBz (for reflectivity and KMZ) and below 0 dBz (for the correlation coefficient).

Step 111: Run algorithms to create a new MESH output at the location for each storm.

Step 112: When the data processing is finished the process-worker application sets up a connection to the weather database and loads the result of a data processing into it.

When a user wants to see these data on the map, they may open a map application, such as, but not limited to, Phixel or the MapSee application, go to the dispatch page and click on the radars tab. Under the hood the application will send a set of http requests to the Weather API website which will retrieve the needed data from the weather database.

Step 113: View storm scans and get higher resolution results for each station and create/consume NOAA scan polygons that are within residential areas and meet impact criteria.

Step 114: Review hail coverage areas and send high-impact area polygons as a UAV task to be injected into the flight mission plan for the UAV.

Step 115: Review and process all high-impact locations and compare with existing client database and locations (either storm derived or historic based).

III. Wind Processing

Since the process will already have the MRMS data that are compared to stations, the areas where there are hail storms that have potential damage are known. Since the station and timestamp are known, the same NOAA data may be used obtain wind direction and wind speed. The same polygons from the MESH process may be used in another supplemental process on the same areas/polygons.

Once there is a first estimate of the wind speed and direction, the process tests that estimate against several variables to make sure that the estimates are reasonable. The NEXRAD velocity values only show winds along the radar beam, so those winds must be compared against another dataset (from NOAA or another source) to calibrate the wind speed and direction. This involves several trigonometric functions (e.g., sine and cosine), along with normalizing functions, to arrive at a reasonable estimate and to remove some of the noise (through filtering).

A sample process for wind processing would include the following steps:

Step 201: Download the necessary binary data from the noaa.gov servers and upload it to the proprietary bucket because these data has a limited lifecycle on the noaa.gov servers.

Step 202: Process hail scans/NOAA NEXRAD data that are already being processed for hail damage.

Step 203: Copy any additional related RAP data to the local system for processing.

Step 204: After files are uploaded to the proprietary bucket, these files are added to the processing queue (this queue will store the wind related data only) to be able to process it in chronological order.

Step 205: Run an algorithm to compare each storm scan and create wind centroid polygons to compare and associate with existing hail processing to complement hail polygons that are within areas of interest and meet impact criteria.

Step 206: When the downloading is finished, the process converts binary data to the shapefiles (through NOAA's Weather and Climate Toolkit (WCT) client using specific configuration files). A shapefile is a simple, nontopological format for storing the geometric location and attribute information of geographic features. As a result, a set of shapefiles will be obtained which should be intersected between each other (these files can store the wind direction, wind speed, reflectivity data, correlation coefficient data, and any other relevant data). After the processing, a geospatial file, such as, but not limited to, a geojson file will include necessary information about the wind.

Step 207: When a geospatial file is be created it may be uploaded to the weather database through the Weather Utilities application (executed in the process-worker container inside the Kubernetes cluster).

Step 208: After that the map application user can see these data on the map application website by sending an http request to the application. It will be shown as an additional weather layer displayed on the map with a set of points represent the wind direction and speed.

Step 209: View and compare each storm scan and create wind centroid polygons to compare and associate with existing polygons produced by storm processing to complement any such polygons that are within residential areas and meet impact criteria.

Step 210: Verify and adjust boundaries to area of interest boundaries to optimize flight times and flight coverage.

Step 211: Review wind location coverage areas and create/send high impact areas polygons as a UAV task to be injected into a flight mission plan for the UAV.

Step 212: Create a task from the area that is assigned to a UAV pilot.

A sample technical process for wind processing would include the following steps:

Step 251: Determine how far away from radar to estimate wind. There is a practical limit on how far away from the radar that reliable measurements can be made. Note that the radar beam height increases above the ground as one goes away from the radar. By way of non-limiting example, a range of 3000 to 6000 feet would give coverage over a large part of the central and eastern CONUS.

Step 252: Acquire and filter the velocity data. The next step is to acquire the velocity data for the lowest scan (~0.5 degrees) of the storm/polygon. Thunderstorm winds can extend 5-10 miles outside/ahead of a storm, so gates/pixels acquired may extend over a larger area than that of the hailstorm polygon. The data may be filtered to remove data below a given threshold for radar reflectivity and/or correlation coefficient; in one embodiment, this includes data below 18 dBZ and with a correlation coefficient of less than 0.96. Also, if data from multiple radars is available, the data may be averaged together.

Step 253: Compute the latitudinal (X-distance) and longitudinal (Y-distance) distance between the two different points of the radar and the location of the wind velocity pixel using the Haversine formula, known in the art.

Step 254: Compute the height of the radar beam above radar level (ARL) using the formula h=(D*sin(PHI))+(D$^2$/2*IR*Re), where h=height of radar beam ARL (in km), D=distance from radar to range bin (in km), PHI=radar elevation angle (in radians), IR=refractive index (1.21), and Re=radius of Earth in km (6371 km).

Step 255: Compute the azimuth of the radar beam using trigonometry. Using the results of step 253, the azimuth (in degrees) is 90-atan(Y dist/X dist)*(180/Pi) if the X distance is >=0, and otherwise, 270-atan(Y dist/X dist)*(180/Pi).

Step 256: Acquire model data from a source providing high-spatial and temporal resolution analysis/assimilation data for near-surface weather conditions to get a first estimate of the wind direction and speed at the surface. Using the latitude/longitude of this model data, match them to the corresponding radar pixels.

Step 257: Using the information from step 256, calculate the angular difference between the radar angle and the wind direction.

Step 258: Filtering by wind direction, filter the velocity data according to each gate's azimuth. If the gate's azimuth is within 20 degrees of being perpendicular to the storm motion or wind direction (within 20° of 90 or 270), then those pixels should not be used because they would give unreliable estimates of the wind speed.

Step 259: Calculate the component of the radar beam along the wind direction using the cosine of the value for the azimuth angle in radians minus the angle of the wind direction in radians.

Step 260: Scale the first estimate of the wind speed at the surface by dividing it with the value obtained in step 259.

Step 261: Calculate a radar weight factor based on the height of the beam above a given threshold height.

Step 262: Calculate the final wind speed using the equation $(1-W)*V+(W*S)$, where W is the radar weight factor, V first estimate of the wind speed, and S is the scaled wind speed estimate.

IV. UAV Mission Area Analysis

Once the data is processed the user can view/visualize all storm damage information. The user will then go in to verify and make sure that polygons intersect with high incidence of these high value areas based on demographics, satellite photos, or preselected high value areas and to verify that the large MESH locations within the system match up with the areas that need to be flown. Basically, the user only needs to fly areas that are actually of interest within the damage area. This allows the user to cover large areas at maximum efficiency and coverage. With this information, the user can then trim down, clean up, delete or adjusted areas to fit the needed neighborhood or area of interest. Once complete the user may select or send those directly to the field using, through automation, a UAV application.

The flight team will then be able to load the area/task and navigate directly to that area. Once they navigate to that area, they can download the area/task and as a next step they can then create or view the flight mission. As a first step they are prompted to, if needed, take the boundaries that were created by the storm processing and adjust them to fit in the field adjustments based on real world visualization of the area. Typically, satellite photos are highly accurate, so once in the field, minor adjustments may need to be made for safety and optimization reasons. These adjustments may or may not need to be made to avoid cell towers, trees, tall buildings, power lines, water towers, natural features, and any other structures. Within this flight mission they can then choose altitudes for 3-D flights which is either a single overlap or double overlap flight pattern.

Once this is done, the user can then go directly to the mission planner and UAV sensor configuration, sensor overlap front and back, angle of the sensor, whether the sensing angle is a nadir or any other angle. They will also be able to specify the speed of the UAV. For type of flight, the user can specify a continuous flight, which is a flight where the UAV takes sensor readings as it flies along a route, or a waypoint flight, where the UAV flies to specific location, stops for a period of time, takes a sensor reading and then continues on to the next waypoint. Once the pilot in command (PIC) is satisfied with the mission planning, they create the mission. The application then takes all the parameters and optimized the size of routes, distances, and creates the waypoints needed to cover the area/task. The application then goes to the next screen where it shows the mission routes on a map.

Based on visual location and GPS location of the PIC and team, and size of the team, the team can then decide who will fly each route. The PIC will coordinate a safe flying mission based on FAA regulations, within FAA regulations and also in-the-field conditions in the area of interest that they are flying in. As part of the team one or two members may also go in and place large ground control points (GCPs), that are evenly spread across flight mission coverage area. These GCPs will stay in exactly the same place during the duration of the flying within that area/task. Upon completion of UAV flying or if enough team members are available one team member will go collect GPS points for the center of each individual ground visual GCP, this is typically show as a large X, or an easily identifiable colored box. Upon completion of each route by each individual team member that team member may then fly different routes until all the routes within a specific neighborhood or area of interest or area/task is complete. Also, each team member may note beginning and end times of the flights route in order to have secondary verification of all data collected. Once all routes within a mission and all ground control points and GPS location have been collected, team will then be able to go onto the next area/task Optionally during mission planning if the area/task notes indicate, team will fly a 3-D mission. This mission may require a high-resolution camera and custom set up. If it is recognized that the terrain of the area/task is hilly or has a large variance of the relief in the elevation, the team can adjust the elevation of each way point based on US Geological Survey (USGS) or other geological survey elevation data. Each waypoint does a look up of the latitude/longitude of that point and gets the elevation difference between the starting point of the route and that waypoint and then makes an adjustment accordingly.

As part of the mission planning, when the flight mission is computed, it takes into account the full extent of the area even though it may be very large process; the UAV application makes sure that no excess way points are created. If a team flies in a large area and they have to pick up and move 1000 to 2000 feet adjacent to the last flight area, problems of loss or excess flying can arise. This causes issues with creating extra data on the periphery of each route. As part of the UAV application, the whole area of interest may be processed together and then subdivided based on maximum appropriate way point collection parameters. This helps the team be versatile and agile based on area of interest, weather, and sun-shadow conditions, and not have to worry about losing data, having to fill gaps in between layers or routes or creating extra or double collection of waypoints.

Once all data is collected for each area for the day, the team can use several methods to upload the flown area/tasks into cloud environment. This process can be up loaded via on demand cellular devices that each controller is connected to or depending on cellular connection be uploaded after or at the end of each day using Wi-Fi.

A sample process for mission area analysis would include the following steps:

Step 301: A UAV operator may use a standard network to connect and pull area/tasks from a database. These tasks may come in the form of electronic assignments through a standard communication remote network. Once the UAV operator receives these tasks, the operator will be able to navigate to the location that the area of interest is located. Once the UAV operator selects the area/task that will be completed, they will be able to load and view mission details. The UAV operator may use software to be able to receive notification of areas of interest that will need to be flown. The UAV operator may also be able to verify, based on field knowledge that the area/task in question is within an area of interest that needs to be completed as desired.

Step 302: A UAV operator can load an existing area/task using software and view a list showing all tasks with emphasis by location, by priority, schedule, or classification need. Also, the UAV operator can view how near, by proximity, to the location, the UAV team is in, in relation to their current location. Once the area/task is loaded the UAV team lead can verify the extents or perimeter of the area to be completed. The extent of an area/task is displayed as a polygon. The UAV operator can adjust the size and shape of the polygons in question.

Step 303: The UAV operator, using software and network capabilities, can receive not only assigned areas/tasks, but may also receive notes, schedule or due date, or classification requirements for each flight mission. These flight requirements may include the pattern of the mission, purpose of the mission, type of classification, sensor type, camera/resolution needs, altitude, and any other qualities which may affect the mission.

Step 304: The UAV operator may, while out in the field create an unplanned mission. This unplanned mission could be based on field operator's expertise or common knowledge of the area, or, if, while completing a planned mission, the UAV operator recognizes an adjacent area or neighborhood would be worthwhile to use the UAV system to capture field data there as well. The UAV operator may select or create a brand-new ad-hoc flight via software. This may be displayed on a map with a polygon centered around the UAV operator's current location with a small polygon buffer. The UAV operator may adjust the size, shape, and extents of the mission that needs to be flown.

Step 305: Once the UAV team is ready to start the mission, they may navigate using GPS network technology to receive current location and location of the flight mission. Once the team is in the field, they can then look for the best place to start to fly the mission. The team may take into consideration the need to lay down ground control points (GCP), and to be centrally located in the area or neighborhood in question.

Step 306: On arrival of the UAV team, a second team may place 3-5 evenly distributed, GCPs. These GCPs may be physical, large X's or boxes, and are anchored to the ground for the duration of the mission. During the UAV mission, these GCPs may be viewed and captured by the camera or sensors that will be used on the UAV mission. These temporary X's or GPS locations, provide a way for the data captured from the UAV, when it is stitched (2D model of whole area of interest) together, to be verified and anchored to these points or real-world coordinates using common photogrammetry methods. Once the collecting the GPS, or real-world latitude/longitude coordinates is completed, the GPS coordinates or data can or may be stored in a cloud environment using conventional network technologies.

Step 307: The UAV operator may use software to plan the mission. This mission planner may give options to the UAV operator at the time of the mission is ready to be completed.

One option the operator may choose from is to fly a boustrophedonic or serpentine grid pattern across the whole area of interest. This pattern is used to get full coverage of an area/task or neighborhood. The operator may choose whether the type of mission is a 2D or 3D mission. Depending on the mission, the pattern may be flown only in 2 directions, or in more. This typically is called a single or double grid. For a 2D flight, a single grid or serpentine pattern may be flown; for a 3D flight, a double grid may be flown. Additional grids may increase the quality of data and the final image obtained based on the flight. Other flight patterns may include perimeter and orbit modes. Perimeter mode captures oblique images from the perimeter of a mission extent or AOI (polygon), facing towards the center of gravity of the mission area. The PIC can control the interval, speed, and altitude of the flight as images are captured along a perimeter path. Orbit mode captures oblique images from the center of a mission extent or AOI (polygon), facing towards the center of the mission area. The PIC specifies the diameter/buffer distance that each orbit or circular path will fly from the mission center. The PIC can control the interval, speed, and altitude of the flight as images are captured along a perimeter path.

As another option, the operator may choose the altitude that the mission will be flown. This altitude will typically depend on the type of classification that will be used for the area or neighborhood. The altitude controls the resolution of the sensed data on the ground. This is called Ground Sample Distance and represents the distance in real units from a pixel center to the next center of the adjacent pixel. So, for example, a GSD of 1 inch can be collected at an altitude of 120 feet on a UAV the has a 20 MP camera, but if the altitude is changed for the mission to 75 feet, a GSD of 0.3 inches can be captured.

The UAV operator may choose a camera angle or sensed angle as well, a 90-degree angle which is nadir or directly down, or any other angle for the camera. To verify the overlapping or the ability to use photogrammetry and stitch all of the area of interest sensed data collection together, the operator may adjust the forward or side overlaps of the sensors. This overlap typically takes into account the buffer, or Field of View (FOV) around each capture point/waypoint to make sure no objects or obstacles are missed within a flight pattern. Also, when building a 3D model, each object that may be or is desired to be in the resulting model should have at least three to five versions of each object in each photo. If a 3D model is desired, the UAV operator may choose a larger overlap, such as, but not limited to, an 80% front overlap (the direction the UAV is flying), and a 60 to 80% side overlap (left, or right of the direction of flight).

The UAV operator may also choose different flight types. These flight types, are in two different options, continuous and waypoint mode. Continuous mode is where the UAV continuously flies and doesn't stop except for at the perimeter of each area that is flown, but takes a photo at spaced intervals. Waypoint mode allows for the UAV to stop in spaced locations, and capture a photo or any type of camera or sensed data at each stop. Spacing may be even or uneven. So, for instance, the UAV may fly to a starting point, and then fly in a straight line, and stop every 20 feet, stop for one second, capture or sense the data, and then continue to the next Waypoint. Typically, there may be anywhere from 1000 to 5000 waypoints within a given area/task or neighborhood.

Lastly, UAV operator may select different camera profiles. Each of these profiles represents a different type of camera system. Each sensor system may have its own width and height resolution, focal length, sensor width, and height.

For example, a UAV operator may start a mission based on area task requirements in an area of interest at 120 feet. As part of this flight, the operator may use a camera system that may return or result in a 200 pixels per square inch results or a GSD of 0.02. To get this result, the operator may fly the 120 ft altitude as mentioned and may specify a double Boustrophedonic/Serpentine pattern, or double grid. These parameters will provide data to be used to create a 2D, and a 3D model of the area/task completed. A classification library of the data captured may be loaded into a cloud environment via common networking. These processes may compare the result model data and look for like or similar features within the data captured to previously sensed, and classified like features. For instance, the library may have a built classification that stores a verified 'missing shingle tab' classification. The data captured may be processed either locally, or in cloud environments to compare, find, and tag like data that is similar to the data within the classification library.

Step 308: Upon completion of a mission plan, a UAV operator may select and process the mission plan using software. A software system will allow UAV team to create a mission based on the input parameters and area/task and may build for the polygons in question. Usually, a mission processes a small, medium, or large area of interest, such as, but not limited to, a neighborhood, and subdivides this area into team sized polygons. These sub-polygons, called routes, will allow the team to capture and or fly the mission in smaller more localized areas. Each UAV team member will be able to fly an individual route, typically in less than 20 minutes. Depending on the number of team members, many routes can be flown at the precisely the same time. In another option, many routes can be flown or completed at the same time using a swarm configuration. The routes and mission in full will be displayed on a map that each UAV team member or operator will be able to view, load, and complete each assigned route. This allows the flight team to canvas large areas at maximum efficiency and coverage.

Step 309: Once a UAV team begins a mission, they may have many options at their disposal to complete the mission. One option may be where the operator may adjust all waypoints for the mission based on a USGS or cloud-based elevation model. This altitude adjustment may allow all waypoints to be adjusted slightly based on the terrain of the area of interest. This adjustment may be made as a whole or for all waypoints, or individually for each waypoint. During UAV operation and mission flight, an operator can stop, pause, or restart the route flight. The stop-start and pause operations allow each UAV operator to make adjustments and use onboard sensors to avoid obstacle collisions. Also, if need be, the UAV operator will have the ability to avoid a collision, and then be able to adjust, re-fly, or continue a flight after avoiding an obstacle. By way of non-limiting example, such obstacles may be trees or transmission towers. Each mission is flown in a serpentine or boustrophedonic pattern; this pattern or serpentine pattern allows the most efficient way of flying a large area for an area of interest coverage. All these operations may be controlled via onboard sensors software and or network or in the cloud-based administration.

Step 310: After each route is flown, the UAV team may go to the next route quadrant center to fly the next set. As they go, the second team or auxiliary team may collect GPC GPS coordinates for each location placed before mission start. Once the team completes the full mission, team lead may verify all routes have been completed, or all sensed data has been captured and stored accordingly. Upon full completion, the team may proceed to the next area task to be completed Step 311: Upon completion of a mission or phase of a mission, UAV team may synchronize with a network or cloud environment and/or upload all data captured. These options may be removing a removable memory device out of a UAV, or connecting the UAV and uploading data to a network or stand-alone computer. Another option may be during mission flight and data capture; the data can be streamed directly via Network technologies to either a cloud-based environment or a local-based environment. Another option maybe where the software at mission complete may automatically save all mission captured data and store in a cloud environment or locally.

A sample technical process for mission area analysis would include the following steps:

Step 351: Polygons from the Storm processing load in the UAV system. These polygons show an Area of Interest (AOI) and are typically sized to fit 300-800 homes.

Step 352: The pilot team loads and plans around AOI groupings to maximize time, effort and team efficiency.

Step 353: Loading the UAV application, the team can see these AOI as Tasks/Areas; once they select the Task desired in the list, they can view size and any requirements for the flight Step 354: The team navigates to area/task and decides the best places to launch the UAV.

Step 355: The team may place GCPs in up to 3-5 evenly placed points with large visual indicators that can be seen easily from the UAV.

Step 356: The team optionally collects the GPS location of all GCPs placed.

Step 357: The team pilot loads UAV application and selects an area/task that is ready to fly.

Step 358: A screen is loaded to show the task on map and can be edit/adjusted to fit field adjustments.

Step 359: The mission planner screen is displayed.

Step 360: Depending on type of storm polygon or damage, a 2D or 3D mission will be selected.

Step 361: Depending on type of storm polygon or damage, different flight altitudes can be specified. By way of non-limiting example, flight altitudes for wind damage may be flown at 120 feet above ground; for 3D missions, altitudes may be flown at approximately 100 feet above ground.

Step 362: Depending on terrain, the pilot can change or fly the mission with an altitude taking into account the altitude of the ground above sea level; this allows the approximately constant distance above the ground to be maintained as the UAVs fly over uneven terrain in hilly areas of interest Step 363: Team members may specify how many team members will be flying for a loaded area of interest Step 364: The UAV system sub-divides whole AOI into manageable flight routes to be used for each individual pilot flight. Note: In order to use a serpentine pattern to get full cover, a Boustrophedon pattern may be used. A polygon equal result algorithm may be used to create approximately equally sized polygons that, by way of non-limiting example, do not exceed a given size on the side, and that do not exceed a given number of waypoints within each route. These polygons are used as routes that will be flown by each team member using a single UAV.

Step 365: The UAV system avoids extra overlaps, and subdivides the route into waypoints.

Step 366: The team flies the mission with each pilot flying their own routes within the AOI mission as a whole.

Step 367: The team completes and loads all completed sensor data into local, or cloud environment using Wi-Fi, cellular connections, or physical transference. Users may have multiple options to upload photos from the UAV, such as, but not limited to, from the UAV application to a server/database, from the UAV application to a removable memory, or from a removable UAV memory. When transferring from the UAV application to a server/database, data files may be uploaded via in-application file manager screen directly to a server either in foreground or background. The total file size could be large, requiring a stable and high-speed network connection. When transferring from the UAV application to a removable memory, such as, but not limited to, an SD card, data files are downloaded via in-application file manager screen into mobile device removable memory. A user could later insert it into PC or laptop adapter and upload the data files. When transferring from a removable UAV memory, a user connects the UAV to a PC or laptop via a wired connection, manually looks for data files, and uploads them. Removable memory and UAV memory may comprise any computer-readable storage device capable of holding the data, such as, but not limited to, a non-expansive memory, fixed RAM, ROM, CD-ROM, disk, tape, magnetic memory, optical memory, or another computer-readable storage medium.

Step 368: Once the area/task is complete, the user can go onto the next area/task.

Based on the area flight requirements or classification needs, optical sensing cameras or other sensors may be used to capture data from different altitudes. Each altitude may serve different purposes. A single option for flight height may set a height at 85 feet. The UAV may use a specific pattern depending on the area if its needs are 2D or 3D based. Another option may only need to lower the quality/resolution camera to capture data. Different types of cameras use quality or resolution, but this can be changed based on the kind of classification for the area of interest.

These techniques and systems use an Unmanned Aerial Vehicle (UAV) to assess structures and other property. To capture a chain of images of the target object such as a structure, a UAV may hold an imaging system. Initially, the UAV may position itself above the identified location, allowing for a nadir image of the determined location that includes the target structure. A non-image scan data such as, but not limited to, sonar, radar, or LiDAR, may be used by the UAV to capture and collect a list of closer images. Depending on the classifications or types of agendas being executed, the UAV may subsequently position itself around the structure to collect inclined or oblique images.

A UAV operator may follow a boustrophedonic pattern used in both 2D and 3D models. To get full coverage of the flight mission, this serpentine style model is used. Also, to get approximate equally sized polygons that do not exceed a given size on the side, but with a certain number of waypoints within each route, a polygon equal result algorithm may be used. Each team member utilizes these polygons as routes for flying using a single UAV, or a UAV swarm (Multiple UAV's flying in succession). Two boustrophedonic patterns may be used in a 3D model. Each model is perpendicular to the other thus creating a 4-way flight pattern.

A target structure is included, and the UAV positions itself above the location of interest, thus allowing the imaging system to capture a nadir image of the affected area. While the imaging system captures a list of closer pictures or collects non-image scan information, the UAV may follow a boustrophedonic flight path.

The UAV operators, during mission planning, can choose to fly the mission using locations or long pairs called waypoints. During flight time, the waypoint may be loaded into the UAV. Each waypoint grouping is called a route. These routes are polygons which have approximately the same size and the same number of waypoints. The UAV stops at each location in waypoint mode, takes a photo and then moves to the next waypoint or location. The UAV environment can accommodate an individual, team or swarm of UAVs. The continuous mode is also another way to collect data from the UAV. Continuous mode doesn't stop the UAV to collect data; it collects as it is flying.

As part of the team one or two members may also go in and place large GCPs that are evenly spread across flight mission coverage area. These GCPs will stay in exact same place during the duration of the flying within that area/task.

Upon completion of UAV flying or if enough team members are available one team member will go collect GPS points for the center of each individual ground visual GCP, this is typically show as a large X, or large easily identifiable colored box.

Depending on the type of flight mission, an operator who starts a mission may adjust the area size. If the area is too small, or too large based on field analysis, the operator can either increase or decrease the size of the air that needs to be flown. In one embodiment, the operator can get rid of points that make up the exterior of the area polygon, then continue on with the creation of the flight mission. In another embodiment, the operator can increase the number of points, or drag the existing polygon coverage to fit the needs in the field.

V. AI Deep Learning and Processing, Onboard and Cloud

An artificial intelligent onboard (AI or AIO) UAV system can include hardware chips, AI enabled chips, GPU tensor core chips, IMUs, sensors, solid-state drives, and solid-state LiDAR. This onboard system also includes software to run specific hardware routines, artificial intelligence with deep learning processes and algorithms. The system will pull saved libraries from a cloud environment that may be utilized in localized UAV project. There are multiple options to build 2D/3D models, and for feature recognition to construct this artificial intelligence onboard system.

A deep learning model utilizes a convolutional neural network (CNN) to detect features of interest within UAV acquired aerial imagery. The model is trained with thousands of pre-labeled images which allows the model to learn useful representations of the input data. A trained model's weights (i.e., the specifications of how a model alters its input data to learn patterns) can be saved and used to make predictions on new data. For the UAV AI system, the model is fed thousands of pre-labeled image tiles (i.e., small, ordered subsets of a larger image) as training samples so that patterns and shapes making up features of interest can be learned. The model then classifies new image tiles into meaningful classes (e.g., damaged shingles, rooftop, and so on) based on the saved weights from previous training.

One option is a feature recognition process. This feature recognition system will use computer vision technology while a UAV is flying. This system will scan and recognize in real time potential features and their extents. Once it finds a feature/building extent, the system may create a subset of areas or regions within a FOV. Within this subset area, the system can look for damage or patterns in real time. The method may also be able to mark or annotate these locations with text directly in a 2D or 3D environment or save the locations to be used later in a geospatial system. Lastly, the system may be able to show measurements and distances visually, using commonly recognized patterns or linear features.

A 2D/3D environment option for this onboard system could replace the approach and method of processing or building point clouds. The current practice of creating a point cloud from UAV data starts with the UAV collecting, typically, hundreds to thousands of images. Next, the UAV software or system saves and geotags the images then load them into a cloud environment. A cloud-based system then uses photogrammetry software to stitch all these images together, and then builds the point cloud. Another approach would be to do the same thing that the cloud environment does but do it directly within the UAV and its artificial intelligence onboard system. The system would to run a comparison of each data block as the data is being gathered on the UAV. The AI will, as new data is collected, run or use photogrammetry on each adjacent data that was collected just before the current block of data. Another feature will be the registration of each new set of imagery with lasers (4 points) to capture visuals that that allow the system to anchor the imagery directly to the ground. This anchoring streamlines the photogrammetric methods and allows the system to optimize the point cloud process. The result is a faster process building a point cloud directly within the UAV onboard system.

Another 2D/3D environment option on the feature could be to use this onboard system to build a digital elevation model or digital terrain model using a combination of LiDAR and captured imagery. A LiDAR sensor or solid-state LiDAR sensor can broadcast/pulse laser information within a field of view (FOV) and return distances from the UAV to the ground. These then can be compared with the UAV GPS coordinates to build a 3D canvas for the FOV. This 3D FOV, called a digital elevation model (DEM), enables the system to drape or overlay the captured image directly over the DEM and create a real-world view of the FOV. This process can run these photogrammetric methods in the onboard environment directly on the UAV.

The AI onboard system may include many components. Any of these components may be swappable, built-in, commercially available ("off the shelf"), and/or customized to the UAV. These components may include any of the following.

A large format camera may be between 25 to 150 megapixels, having a field-of-view with a ratio of 4:3 or similar. An infrared and/or thermal camera may be utilized to cover the same field of view as the large format camera. The resolution doesn't need to be the same as the large format, and may be in a larger or smaller megapixel range.

A pulsed laser/LiDAR system may include three to four pulsed lasers placed precisely to be symmetrically distributed in the field-of-view of the infrared camera. The pulsed laser will be visible and captured within the captured photo from the field-of-view of the infrared camera. The points may be evenly distributed within the view to allow for accurate georeferencing of the scene as a whole.

The system may also include laser/LiDAR sensors to capture and collect the pulsed laser return information. These collectors will allow the system to calculate the distance from the pulsed laser to the target that was captured or pointed at and return or store those distances. These returned distances and processed information may be stored for the waypoint sensed group data.

Another feature or component of the system may be a solid-state LiDAR, LiDAR on a microchip. A solid-state LiDAR system is composed of transistors, resistors, and capacitors necessary for a working computer and integrated them into a single silicon chip. Solid-state LiDAR performs the same functions as LiDAR, but integrates all the separate mechanical parts into a single microchip. A solid-state LiDAR chip and its sensor may be placed with precision to sense and capture discretely within the field-of-view of the infrared camera. The pulsed laser may be visible and captured within the captured photo from the field-of-view of the infrared camera. The points may be evenly distributed within the view to allow for accurate georeferencing of the scene as a whole.

Another feature or component of the system may be a Real Time Kinematic (RTK) sensor on the UAV, and an optional RTK sensor on the ground called a ground station. With one or both of these sensors, the UAV will be able to be triangulated with precision GPS from the ground and the UAV and return a more accurate GPS coordinate to be used for each group of data sensed.

Another feature or component of the system may be a GPU with tensor cores. Such GPU cores were originally designed for physics and graphics computation, which involves matrix operations. Such GPUs are useful for this application, due to the matrix heavy nature of machine learning (neural nets). Tensor cores are heavily specialized to the types of computation involved in machine learning software. Tensor cores are useful for physics and graphics computation, and are easier to parallelize than general computing tasks.

On-the-ground laser points may be calculated to X,Y,Z coordinates as pseudo ground control points by knowing a few variables, including: GPS position of the exposure center of the camera (requires measurements/calibration of lever arms, calculation of boresight), angular and horizontal displacement of lasers compared to exposure center of camera (also requires measurement/calibration of lever arms, calculation of boresight), and distance of laser center to on-the-ground point (collected by the laser itself).

The LiDAR components may be useful because normally a simple collection of ground points that is separate from the typical point cloud processing is used to correct the GPS locations and/or lens distortion of the camera, typically with an independent, higher accuracy GPS than the platform. In one embodiment, any collection of laser ranges/points from the platform will be based on the GPS of the platform itself, without requiring any correction of the GPS. GPS points captured during UAV flight may be used to assist and enhance the quality of a 3D point cloud collection, particularly in areas that often result in poor image matching due to low contrast objects or dense patterns. The points (XYZ and image coordinates) may be collected and marked automatically by the AI, and will help increase the overall accuracy and quality of any output of the AIO.

When registering and transforming the images, one option to register all collected imagery is to use internal tie point collections in post-processing to align photos from different cones and merge into a single multi-band image. Another option is to calculate the "lever arms" and "boresight angles" of the separate frames and apply the shift values to each image's GPS/rotation values independently. This may be less precise than the first option, but it removes the possibly of tie point error in image stitching and would only need to be done periodically.

A Vision Waypoint System (VWS) is a system used to capture all types of computer vision data with multiple sensors, at a specific location or waypoint from a UAV. The AIO or Artificial Intelligence Onboard system is a combination of software and AI sensors, computer chips, and software to process and compute labor intensive UAV imagery and output from a VWS.

During data capture for a group of sensors, a Vision Waypoint System data block will be created and is called a VWS block. This VWS data may include: large format image data, infrared image data, thermal image data, and ordered data indicating GPS coordinates for each laser coordinate with distance and point identification, original GPS coordinates, and be stored in a local database.

Each VWS data block has potentially eight adjacent VWS data blocks. For example, while a UAV flight pattern is being followed, each new waypoint, upon completion of capture, may have adjacent FOVs that have already been captured. These adjacent FOVs could be behind the current waypoint, to the left, to the right. Also, these adjacent waypoints may be being flown by another UAV operator. These adjacent routes may be tagged for further processing using In-the-field networking(mesh), or stored in the cloud for later processing. As part of the AIO, all of the adjacent blocks need to be processed to look for overlap, and then within that overlap, identify, mark and record identical patterns with each overlap block. These Octadic Adjacent Data blocks, or OAD, are crucial to building a high-quality point cloud.

A UAV operator may use the onboard AI system or AIO to process, create and manage VWS data. The UAV operator will use mission planning using patterns and areas of interest. The UAV operator may use the software system, and the UAV will arrive at a specific waypoint, and the following will be captured or sensed.

As part of the capturing capabilities of the AI, the onboard processor utilizes an AI algorithm to have the ability to recognize or detect common features. These recognizable features could be, but are not limited to, buildings, fences, walls, windows, and so on. This ability to recognize or detect and train an AI system to detect or recognize buildings will allow the ability to avoid or ignore information that is not useful or necessary and focus on more useful elements from a first recognition pass such as, but not limited to, building footprints.

Once there is a first recognition pass, a secondary recognition can be used or assigned. The secondary recognition pass allows the ability to only recognize within first pass recognition areas, detecting smaller patterns that are associated with indicators for features the user wants to identify. Then, once those secondary features are detected, they can be focused on, capturing data through the sensors indicated above for those discrete detected sub-areas. This secondary AI recognition algorithm will allow users to detect or look for patterns or interest, such as, but not limited to, patterns that are consistent with storm damage, missing tabs, and hail damage.

Different types of data can be recognized, such as, but not limited to, area, linear, or point features. These could represent features such as, but not limited to, buildings, fences, windows, downed trees, and so on.

The recognition process may use different methods to capture or compare data. The first way is to use a multiclass pattern to detach feature patterns, and then train the deep learning system to be used with the AI. These patterns are typically groups or clusters of pixels that can be scanned for. At each type of feature needing detection, different options for levels of quality may be used. Feature detection/deep learning can be a process with different methods, and moves in the progression from coarse to fine inference:

1. The feature could be located at classification, which consists of making a prediction for a whole input.
2. The next step is localization/detection, which provide not only the classes but also additional information regarding the spatial location of those classes.
3. Finally, semantic segmentation achieves fine-grained inference by making dense predictions inferring labels for every pixel or indexing the labeled data, so that each pixel is labeled with the class of its enclosing object or region.

A sample process for AI damage recognition would include the following steps:

Step 401: The first data capture may be that the RTK system will capture or use real-time kinetics to get the best GPS point of the UAV's current location and altitude. As part of the RTK system, the capturing of data will also contain angle or direction of the sensor and be stored with the captured data.

Step 402: The second step may be that the system will sync all capturing devices for sensors with the received precision GPS point. This point will ensure that all waypoint data will have the same time-stamp, location, and direction.

Step 403: A real time feature recognition may process the FOV looking for selected features. These features can be based on a classification library and can either be local to the onboard system, or synced and pulled from a cloud environment. This library can be trained to include/add new types of features, and may be based on region, geographic area, or type of feature. In real-time, before the data is captured, all first pass features can be tracked and identified, and present in the UAV system.

Step 404: Next, each first pass recognized feature may be used as a filter. For the second pass, the system can look within those areas for other feature recognition features. Each additional feature will be based on the first pass filter. For instance, in a first pass, a wind or storm damage feature will be used or scanned for with a building feature that was recognized on the first pass.

Step 405: Next, each feature that is recognized may be tagged, both visually and in the system for later retrieval, for both local and cloud-based uses. Each tagging may have annotations for building outlines and damage found, or any feature recognized. These annotations or locations can be captured and or saved in their own resulting layer and be included in the VWS data block.

A sample process for VWS data capture would include the following steps:

Step 501: The first data capture can be that the RTK system will capture or use real-time kinetics to get the best GPS point of the UAV's current location and altitude. As part of the RTK system, the capturing of all data will also contain angle or direction of the sensor and be stored with the captured data.

Step 502: The second step may be that the system will sync all capturing devices for sensors with the received precision GPS point. This point will ensure that all waypoint data will have the same time-stamp, location, direction, and so forth.

Step 503: The third step may be that the large format camera can capture the photo using the field-of-view specified and calibrated in UAV software.

Step 504: The fourth step may be that the infrared camera, while the four lasers are being pulsed, can capture the field-of-view that matches the same FOV as the large format camera. Within the infrared capture, the pulsed laser will be indicated because the light will be visible on the infrared capture. These points or locations can be captured and/or burned in the resulting infrared photo that is captured.

Step 505: The fifth step may be the thermal camera will capture using the same FOV as a FOV for the large format camera. This thermal information may be used as a stand-alone layer, or to augment the infrared capture.

Step 506: The last capture step happens during image capture. All lasers are being pulsed, and sensor collectors will be collecting or retrieving the distance information of the lasers in relation to each the target. The collected information can be captured and packaged together with the GPS coordinates to be used internally and for later user, as well as stored as a block and inserted into the VWS data block. The three different images collected, for instance, can show the distance from the sensor location to the targets on the ground. These distances may be indicated by showing, for example, one with a distance of 40 meters, one with a distance of 48 meters and so on for all 4 points collected.

Once each VWS data block is captured and completed, the onboard processor may process the group of data. First, it will georeference each image based on the laser locations and the distance and GPS coordinates referenced within. This georeferencing will be this will happen using triangulation, RTK and the center of focus which the GPS or Precision location is recorded for. Once the image is georeferenced the processor will then perform a pre-process or partial process to drape the photo (if using a DEM) over the points collected, and or build a pseudo-point cloud (if using an onboard point cloud) based on the collected waypoint group information.

Once the second step is complete, each different photo captured can be used to create a point cloud for each FOV. Each point within the cloud will then also contain metadata or have the three different representations of it within the RGB large format camera pixel, the thermal camera pixel (although it may be sub-sampled due to the resolution differences), and the infrared camera pixel. If possible, or if waypoint data has adjacent waypoint data already captured, the processor can utilize this information to add to or make onboard point cloud results more accurate. This adjacent data could be sensed data that may have been captured by other sensors, or by sensor groups pointed in different directions that were captured at the same waypoint.

Once all data is processed and captured for the group, the data can be transferred using network capabilities and synced to the cloud to be stored and or utilized with the area/task that the overall waypoint group sensed data. Once all data is collected for an area/task then the last component or last portion of the 3D model or point cloud process may be completed. This post process could happen either on the onboard processing system or in a cloud environment.

One option that can be used to process or generate a pseudo-point cloud is by using the AIO while completing a UAV mission. At the beginning of each mission, each waypoint in the area task would run through a process to build a spatial index of all adjacent waypoints. This adjacent index for a field of view would be used as a lookup for every completed VWS and then find if any available adjacent VWS can be processed. A queue may be created that will accept and run a process on two adjacent VWS data block or OAD. The queue can store the OAD identifiers so that the pair can be processed once the processor is available for use.

The following steps are completed during UAV operation and mission/route flying. The AIO engine could be used to perform these options below.

Step 601: For the first step, the UAV operator will use the software system to start or operate the UAV to fly a specific route. Each waypoint within the route may represent a VWS data block.

Step 602: The second step would be at the arrival of the UAV to the specified waypoint, VWS data may be captured using a UAV software system, sensors, and cameras. At these waypoints, a VWS is used to capture a large format photo, at least 4 points of sensed LiDAR, and one infrared image indicating the pulsed laser within the content of the captured infrared photo.

Step 603: Once the VWS has completed capturing and saving, the data for the VWS is loaded into the AIO system. Each resulting image, large format RGB, infrared, and thermal, may be registered or anchored, to real-world coordinates. These coordinates and visual locations are stored in the infrared image. GPS coordinates are also available within the VWS data block, which stores the laser or LiDAR, RTK GPS location combination. The image may be registered using a common Affine transformation algorithm.

Step 604: The third step may be that these points and images that are registered would then be inserted into a local database and registered within a local environment on the UAV. The coverage or geographic extent of the database would match the area of Interest or area/task extent.

Step 605: At the completion of each VWS capture, the waypoint ID may be checked against the OAD index to look for any adjacent waypoints that have already been completed. If an ID is found in the OAD to be adjacent, the 2 or more IDs are inserted into the AIO queue.

Once a VWS data block is identified as having adjacent blocks, the ID is inserted into the AIO process queue. This queue processes two adjacent VWS data blocks. First, the process identifies overlapping image coverage between the 2 images and then clips out that spatial overlap for later comparison. With the identified overlay, the AIO will scan for similar visual patterns in both images. As the process finds like patterns, each location of a similar pattern may be tagged as tie points. With each newly identified pattern, additional tie points are added, and the resulting tie point collection increases. Each new additional tie point adds to the accuracy of the georeferencing for each VWS data block. The identified tie points are added to the OAD database. Once the OAD and the origin are processed, the OAD ID is tagged as complete in the OAD index, and then removed from the queue, and the next record in the queue is started.

Each sector or group of data blocks contains the OAD, all 8 adjacent data blocks, and the center or originating block. Once a sector is completed, that those data blocks can be synced locally or via networking for other UAV processes, or synced in a cloud environment for later use, post-processing, or feature extraction. Each sector contains all original captured data, and all AIO processed or added tie point, DEM, or local database data.

Upon all sectors being completed, a final process to generate the final point cloud can be created. This final point cloud can also be run in a cloud environment or on-demand depending on the percent complete of the point cloud or tie point collection.

Another option can be used to process or generate a digital elevation model (DEM) by using the AIO while completing a UAV mission. At the beginning of each mission, each waypoint in the area task would run through a process to build a spatial index of all adjacent waypoints. This adjacent index for a field of view would be used as a lookup for every completed VWS. A queue may be created that will accept and run a process VWS data blocks. The queue will store the VWS IDs so that the pair can be processed once the processor is available for use.

The following steps are completed during UAV operation and mission/route flying. The AIO engine could be used in these options below.

Step 701: For the first step, the UAV operator will use the software system to start or operate the UAV to fly a specific route. Each waypoint within the route may represent a VWS data block.

Step 702: The second step would be at the arrival of the UAV to the specified waypoint, VWS data may be captured using a UAV software system, sensors, and cameras. At these waypoints, a VWS is used to capture a large format photo, at least 4 points of sensed LiDAR, dense LiDAR point collection, and one infrared image indicating the pulsed laser within the content of the captured infrared photo.

Step 703: Once the VWS has completed capturing and saving, the data for the VWS is loaded into the AIO system. Each resulting image, large format, infrared, and thermal, may be registered or anchored, to real-world coordinates. These coordinates and visual locations are stored in the infrared image. GPS coordinates are also available within the VWS data block, which stores the laser or LiDAR combination with RTK GPS location. The image may be registered using a common Affine transformation algorithm.

Step 704: The next step may be that these points and images that are registered would then be inserted into a local database and registered within a local UAV environment. The coverage or geographic extent of the database would match the area of Interest or area/task extent.

At the completion of each VWS capture, the waypoint ID may be added into an image draping queue.

Once a VWS data block is complete, its ID is inserted into the DEM process queue. This queue processes or generates a DEM from input image data and LiDAR collection data for the VWS data block. The process loads LiDAR point collection, all GPS data, and builds a common DEM based on the same FOV as the VWS block. Next, the process identifies overlapping image coverage between the 2 images and then drapes or overlays the image data over the created DEM. The process can be used on all image-based data, i.e., infrared and thermal data. A result draped photo for each subsequent layer is created. Once the VWS block is processed, a new georeferenced x, y, and z ortho photo and DEM image area created and stored with VWS block. The waypoint is tagged as complete in the index, and then removed from the queue, and the next record in the queue is started.

VI. UAV Imagery Processing

The process to stitch together the UAV imagery begins once a mission is flown and the data uploaded. One stitching program which may be used is Open Drone Map (ODM), an open source UAV processing toolkit, though other open source and commercial software may be used. To upload this imagery, any optional ground control points (GCPs) may be registered correctly, which involves visually comparing and registering each ground control point to match its corresponding GPS point. This task is completed by looping through all the images that are nearby to a GCP visually on the map and then clicking in the center of it to anchor or tie that image to the actual GPS coordinates that match it to obtain sub-centimeter accuracy. Typically, in this process, at least 3 to 5 ground control points are required within the area of interest the operator is flying. As they register these points to the real world or to the location within each photo, typically five photos need to be registered within or for each ground control point.

As the user uploads this information, they also may specify what type of classification for the data. For instance, a classification may be "North Texas missing tab," or "Florida zipper detection," or "North Carolina shake detection," or "Georgia missing tab." Once all these settings are specified, then the user starts the process. This process will then stitch together all the images, which can be comprised of 500-5000 photos. The stitching program may use photogrammetry methods to compare edges and GCPs within and outside each photo to build 2D and 3D models and point clouds. Once completed, this photo will be a single, large orthorectified image, which allows any particular pixel on the image to be captured as if it were acquired directly overhead. To create 3D maps from aerial photogrammetry, the camera is mounted on the UAV and is usually pointed towards the ground using a vertical or oblique angle. Multiple overlapping photos (60 to 90% overlap) of the ground or model are captured at waypoints as the UAV flies along its programmed flight path. Using photogrammetry to create 3D models of ground features and structures, the onboard or cloud environment process creates a photo-realistic 3D model of the area of interest (AOI) that has an accuracy/quality based on the initial camera configuration mounted on the UAV.

This image can then be subdivided into small image tiles that will then be processed and analyzed for storm/hail damage. Each one of these image tiles can then be indexed and put in a queue to be processed by an artificial intelligence system, such as, but not limited to, a TensorFlow AI. While each image tile is created, georeferenced boundaries are created to match the extent of the image tile; this is saved as a reference polygon. A pre-trained AI model then classifies each image tile and assigns a probability from 0-100% for at least one class. In one embodiment, the AI assigns probabilities in four classes: damage, rooftop, background, and NoData. A threshold is then applied to these class probabilities to yield useful end products. For example, an image tile may be assigned a probability of 100% rooftop, 98% damage, 1% background and 0% NoData—a threshold of 75% may then be applied to the damage class so that any image tile assigned a damage class probability >75% is flagged as likely containing damage. Upon completion of processing all image tiles within the system, each image tile's spatial extent and new attribute data (i.e., class probabilities and threshold data) is returned to the verification system for users to be able to view or verify all processed data.

A sample process for UAV imagery processing would include the following steps:

Step 801: As a partially automated process to upload all area/task imagery for an AOI, all data is loaded into cloud repository for storage and fast processing Step 802: A user may visually anchor all GPS data and its corresponding GCP. Each visual GCP from at least 5 photos will need to be anchored/matched with loaded GPS data.

Step 803: Specify classification for storm type and damage matching existing classifications.

Step 804: Upon verification of all photos uploaded, a stitching service may be launched to mosaic all neighborhood/AOI UAV imagery. The service performs orthorectification to create a seamless map for the whole AOI and the given accuracy.

Step 805: The result of the stitch process will create a large orthorectified image that is typically around 4-10 gigabytes depending on the size of area flown and the resolution of the photography. The image may be in a TIFF format.

Step 806: The result of the 3D process will be loading into 3D viewable engine to be used later on in the process.

Step 807: The large orthoimage will be broken into smaller, manageable pixel image tiles.

Step 808: All result times, mosaiced imagery, and supporting files are uploaded in for easy access. The upload may be an s3, or otherwise proprietary bucket, or a cloud repository.

Step 809: A webhook then sends two commands to show all tiled UAV imagery as a layer on the map, and to start AI flow to compare existing classifications with image tiles.

Step 810: The pre-trained AI model then makes multi class predictions for each image tile, such as, but not limited to: damage, rooftop, background, and NoData.

Step 811: A probability threshold is applied to the predictions so that image tiles having a probability in excess of a threshold are flagged for later analysis.

Step 812: Image tile bounding box coordinates, class probabilities, and threshold data are assigned to each image tile attributes.

Step 813: Upon completion of the dataset, all end-products are returned to the main system and loaded into a verification system to allow the user to verify results.

VII. Process Verification

Once the process returns back all the chunk boundaries with each registered information for the categories or classifications, the data may be verified and validated. The boundaries are returned, but typically only the ones that have a category percentage above or below a threshold are shown on the map. Filtering the boundary data this way allows removal of noise for areas that don't have damage, making damage easier to spot. For all these areas that do meet a threshold of interest, an address based on the center of the polygon may be geocoded. This allows a user to then be able to use the results within a lead generation system, track/send all the required information, look up the information for the homeowner, and verify potentially if data for the insurance carrier is on record. As a verification user goes through the data, they can view all the polygons and then also except/reject results that the AI positively identified. If it is rejected, then the area can be removed and not used, and no lead will be generated.

There may be areas within the affected area/task that were not picked up or recognized by the AI. The verification user will then be able to draw directly on the map and mark-up/redline areas that were missed that visually have positive storm damage. Two things can then be done for the new newly identified storm damage areas: first, all the identified areas that were drawn will be geocoded for address information on the fly, and then be placed in line with all the other identified related addresses/locations, Secondly, all newly user identified storm damage can then be sent directly to the AI to fine-tune/adjust the search parameters for the next round/iteration of the AI so that AI can be fine-tuned.

If the user sees that the mission was flown in 3-D, the verification user will be able to go in and view the storm damage in 3-D. Once the user is in the 3-D view, they then are able to redline/draw building footprint, ridgeline and other features that will need to be measured or flagged to support all storm damage/lead generation activities. Upon completion of all verification activities, the user can then directly send all storm related data/address information to a lead generation system. This system may be used for canvassing, sales, and telemarketing activities.

A sample process for process verification would include the following steps:

Step 901: Chunk boundaries matching a threshold percentile for a category are loaded into a verification screen.

Step 902: For all loaded areas, the center of the polygon is geocoded to get the address of the area.

Step 903: Displayed with the areas is the ability to accept/reject the area indicated; if rejected, the polygon of the area is removed.

Step 904: The user can also indicate other areas that the AI missed by drawing rectangles or points on the verification map. These missed areas will be treated as categorized areas and also can be sent to the AI to fine tune the classification library so that next time those areas will not be missed Step 905: Once complete, all remaining areas that don't have an address will be geocoded to create/lookup the address.

Step 906: For all areas that have verified categorization, user may create measurements.

Step 907: The user may display a 3D view of the area and can quickly draw footprints, redlines, and rooflines. Once complete, the system will derive and display all the line work as annotations on the map; these will be added to the system for later use.

Step 908: The user may select an option to automatically filter or connect all existing client database records and prioritize addresses that meet criteria or overlap with areas of interest.

Step 909: The user may specify whether a lead for each address will be transmitted to another user. Such users may be subdivided in separate functions such as, but not limited to, canvassing, sales lists, and telemarking.

To support the lead generation system all leads may contain the following:

1. A storm map indicating storm date and approximate time, and showing storm coverage. This may be a small map that shows the current hail coverage area and how it is in relationship to the address or location specified.
2. A page that shows the location on a map showing high-quality imagery from the UAV results in 2D, and a high-quality interactive map showing building and/or damage polygons that can be, by way of non-limiting example, selected, enlarged, and panned.
3. A 3D map, which will contain a 3D view of the location, which the user can manipulate to change the view and/or the angle to see different sides of the area. The 3D map may also have all original measurements and/or additional calculated values/measurements. The 3D map may also allow observation of redlined areas or a polygon showing, by way of non-limiting example, damage found on a roof, a fence, or wherever there may be damage to property or a home.

VIII. Network/Mesh Uploading/Downloading

Bluetooth, Wi-Fi, IPs and many types of other networks, are amongst the list of systems or ways needed to transfer data remotely to connect with a UAV, UAV application, SD Cards, AWS, S3, and other emerging technologies. A connection of one or more networks to a server are available for a UAV operator/system. For example, the UAV uses a primary interface to transmit images to the server. Additionally, a secondary network such as a local wireless network connection may be used by UAV to connect to the user. Passing of information from the first to the second element is enabled by a gateway created by features such as the UAV, server and operator client which are directly connected to each other. The server may also have a standard flight plan saved on it. Based on the information entered by the operator into the operation client interface, the data may be altered by the mission flight plan on loading on the UAV. Through the onboard or cloud processors, the UAV may also change the standard flight plan based on the other sensor data or images captured. Portions of the foundation that can be utilized with exemplifications revealed and available include—

General-Purpose computers

Computer programming equipment and methods

Digital storage media

Communication networks

Things that may be included in an onboard UAV computer include; a processor such as, a microprocessor, microcontroller, logical circuits, and/or any other processing circuitry known in the art. A particular purpose processing device such as ASIC, a PAL, a PLA, a PLD, a CPLD, a Field Programmable Gate Array (FPGA), or other custom-made or computing device may be included in the processor. A computer-readable storage device, e.g., a non-expansive memory, fixed RAM, ROM, CD-ROM, disk, tape, magnetic memory, optical memory, or another computer-readable storage medium may be included in the computer.

Live streaming is another innovation that can be used in broadcasting collected field data during UAV operation. This data may be streamed using multiple 3G, 4G LTE, or 5G mobile cellular networks and common communication platforms and technology.

Applicable networks for configuration purposes are inclusive of a great choice of the infrastructure of networks. Distinctively, a network may be merged with landlines, wireless communications, optical connections, several modulators, demodulators, small form-factor pluggable (SFP) transceivers, routers, hubs, switches, and other networking tools. Software that is accessible from Novell, Microsoft, Artisoft and other vendors may be included in the communication network. They also may operate using TCP/IP, SPX, IPX, SONET and other protocols over a twisted pair, link or optical fiber cables, telephone lines, satellites, satellites, microwave relays, adjusted AC power lines, physical transfer of media, wireless radio links, and other data transmission links. Smaller networks may be enclosed in the system and be linked to other networks through a similar technique or gateway.

IX. Onboard Chip/Computer Vision Configurations

Many uses or scenarios exist that would be ideal for an Artificial Intelligence mission. These scenarios may be analyzed and captured using an imaging solution. The scenarios are as follows:

Tab and/or Zipper Detection: Tab detection is the process where the AI looks for torn shingles that have been ripped off by the wind during a storm or a large wind event. A typical shingle roof uses what is called three tabs for each shingle. Each shingle is layered on a roof going from the bottom of the roof up to the crest or the peak with only the portions of each shingle being exposed. During a strong wind event or a massive storm, wind can break off loose, old, or exposed portions of a shingle. Since most of these torn shingles expose the darker or less faded portion of a shingle, this pattern is available to be detected by the AI. As part of the AI, the system will look for individual or multiple shingles that may be exposed, ripped, or torn from the roof. In some cases, if the wind gets underneath a torn shingle, it can rip or tear off a large portion or, adjacent shingles this typically is done diagonally due to the nature of how three tabs or shingles interlock. These "zipper" patterns can be detected as well using the AI, which looks for large clusters of turned under shingles or zippers that go diagonally up a roof.

Storm/Hail Detection: In the storm/hail detection scenario, the system typically looks for hail that has impacted a roof, siding, window or any other type of surface that could easily be damaged. Hail usually happens in a large, or very severe, localized area. Depending on the size of the hail, different impact patterns can be created. These patterns, depending on the size of the hail, are what is looked for within the AI. The AI can see individual hail hits on the roof because of the velocity and size of the hail coming down. It can create visual circular hits or damages that can be detected. Also, depending on the shape, the hail can show different patterns on a roof. These patterns can be detected, saved, and used for within the AI and be recognized later on, or within a new area. Lastly, the roughness or smoothness of a roof can be affected by a large amount of hail hitting the roof period. A typical roof, when installed, has a certain amount of roughness that is uniform across the surface of the roof. With a large or localized hail event, roughness or uniformity can be affected and be detectable. Within this detection, different types of patterns can be detected, trained, and recognized using the AI system.

Feature Measurements: While capturing an area or neighborhood, measurements of detected features may be useful. These measurements can be placed on fences, windows, the ridgeline of a roof, square footage of a roof, lot size, driveways and so forth. These measurements can be placed or displayed on the image captured and are called annotations. These annotations may be placed on any detected feature within the AI or recognized feature. The types of features that will need to be detected and annotated will depend on the trained AI. The measurement of locations, linear or 3D features, is possible using computer vision. The system will use multiple lasers to accurately measure and detect features, then measure and annotate them within the system.

Roof Surface Roughness: Another scenario of an AI is trying to detect the roughness of a roof. The roofing material typically has a uniform roughness. This roughness of these shingles or building/roofing material is how they are manufactured. As the roof ages, the roughness still maintains uniformity but can thin and lose some of the granules glued to the base product. This roughness can be analyzed and detected while looking for anomalies or non-uniformity. This lack of uniformity may be caused by many things, such as, but not limited to, wind, hail, and falling trees. Roughness can also be detected using reflection through a thermal sensor. Also, due to the absorption of ambient heat of an area, the absorption rate can also be affected by the roughness or the quality/robustness of the actual roofing material. Usually, scenarios of age and so forth can be detected and sensed with AI recognition.

Roof Reflectivity: Depending on the age and roughness of the of the roof, reflectivity may also be recognized or analyzed. This reflectivity may be sensed and analyzed due to the thermal properties of the roof. This reflectivity which can be affected by the actual age of the roof. The reflectivity can also be a result of the underlying qualities of the building material. This reflectivity can be captured in different ways, such as, but not limited to, using the infrared or a near-infrared camera due to the light that would reflect off the surface.

Building Surface Modeling: Another scenario or use case would be to build a 3D surface model. This model may be used for many different things. The model can be used for construction to be able to visualize the full exterior of the building/property and view any feature that has been damaged. Also, the system would be able to contain each building/structure in relation to other features around it like other building structures. Another use for this model would be to provide or allow city, local, county, or state governments access to these models to allow them to be used for planning, maintenance, or area analysis. Also, another use would be to do volume or area measurements on any surface or facet of the 3D model. Another use would be to provide or publish this information for use within an augmented reality (AR) application. This information could be used to support or compliment any local AR game, use for marketing, real estate or community use. Lastly, the model could be used to verify or detect change. In one scenario, a neighborhood or area or feature was modeled 3 to 6 months ago and a new storm or weather event happens. The new model can be created and compared to the previous model to look for and detect change, and then list the differences or changed features. This could also be used to detect age, vegetation, and so on.

Change Detection: In another scenario, the image solution may be used to detect change. In simplest terms, change detection is the process of comparing an older set of data or captured data through the imaging solution and comparing it to or newer or recent/current data. This changed detection can capture events and then cataloging and or list all the changes found or detected. Change detection before and after may be used to look for age or growth of an area or neighborhoods, or it may also look for building deterioration. This change may be from fire, age, or vandalism, or weather/storm damage that has happened recently. This detection may also be to detect trees that have damaged buildings, roofing material, windows, siding, agricultural constructions, and any other items of interest.

Building Heat Loss/Deficiencies: Another scenario would be to detect building heat loss. Depending on how a building is insulated in the attic and so forth, the building may use heat emission/transmission through the exterior of the building. This transmission can be detected using thermal sensing equipment, which looks for those heat loss patterns. Also, the building could lose heat through old or deteriorating windows or other types of exterior insulation material. All these types of heat loss can be detected within the AI and recognized and marked and listed as part of the AI system.

Neighborhood Damage: Another scenario may be looking for neighborhood change. This scenario could be analyzed for neighborhood damage from a storm. This damage could be building damage, or it could be damaged drainage issues or changes that could affect the neighborhood as a whole. These types of detection could be used by city or local governments to look for incidents such as, but not limited to, damage to the road network, infrastructure, and/or neighborhood, drainage, runoff, and/or erosion.

Neighborhood Wind Damage: Another type of analysis or scenario could be looking for wind damage within a neighborhood as a whole. This damage could be indicated by looking at damaged or dislodged material such as roofing material, siding material, and fallen trees or other vegetation. These types of neighborhood wind damage could be utilized for change detection in areas with higher elevations within a community that have a higher propensity to have strong winds.

Building Measurements and Estimates: Another scenario may be to create and annotate exterior building measurements. These measurements or features can be sensed using the AI recognition for standard features such as, but not limited to, windows, siding, roofing material, front doors, and/or the exterior of the building. With these buildings being able to be recognized, a user can then take each one of these, whether they are linear or aerial features, and then build and annotate each measurement for those features. Once that is done, the system can then accumulate or add all those individual measurements together and build measurements and estimates by category. For instance, the system could get a list of all the exterior windows in the whole building, or get the full area of the roof with each angle and facet. Its measurements and estimates could then be annotated and included in list form as well as displayed in the image data set that is returned.

Road Damage/Inspection: Another scenario would be to use the AI recognition to look for road damage. These roads could be in the middle of a neighborhood and be analyzed for stress cracks, erosion, or storm damage whether it be a storm event or otherwise. This recognition may also be used for local, county, state or federal governments to look for road damage, potholes, wear, fractures, deterioration, and road damage due to erosion, among other features. The system may also use change detection to compare what the road looked like 6 months ago as opposed to the current appearance. This change inventory may then be loaded, or viewed within a Highway Asset Management system.

Bridge Inspection: In another scenario, the imaging solutions recognition may allow bridge inspections. These bridge inspections may be based on Federal Highway Administration (FHWA) standards using Rating and Rehabilitation values to rate the current state of bridges and then provide data on how they may be rehabilitated. The FHWA and several other groups have designed core categories of sections of a bridge that need to be analyzed. These elements are a central portion or building block of a bridge that needs to be assessed. The areas of interest for these core elements are the superstructure, the substructure, the decks and the culverts of the bridge. The bridge coverage may be broken down into ten-foot squares. These squares or grid may be indexed, mapped, and analyzed for each segment of a bridge and built a grid. As the imaging solution captures data for the bridge, each square 100 foot of a bridge may be rated for stress, cracks, age, and/or other characteristics. To provide more granularity, the system may also within those 10-foot squares, break down into 1-foot blocks and create the same rating. Based on the AI and how each square 100 foot of a bridge is classified, the rating system can then be inventoried and then compared against the FHWA approved or supported building inspection system. With this information then each bridge within a local, county, state or federal bridge can then be analyzed to see what needs to be rehabilitated or repaired. This one-foot subsection area grid may then be analyzed over time to look for change detection and so forth. Then the system managers can over time, see how fast or how soon sections of the bridge need to be repaired.

Solar Panel Optimization: In another scenario, the AI solution builds a solar panel optimization process. This optimization system can scan an area, and this may be the whole neighborhood and optimize each location or structure, or a single structure. The system may then take into account the date, and latitude/longitude and with its corresponding angles of the sun and then compared to the structure facets that are ideal for solar panel placement. The system may identify facets of the structure that is facing the South or within the range of solar placement optimization, and mark or annotate those areas. These results can then be used to specify and list the available or number of panels with different variables that could be supported on top of the building or structure. The system may also analyze or have an additional process to identify foliage or trees that could cover or shade the area that is identified for solar panel placement.

Insurance Fraud Detection: Another scenario of the AI recognition system may be used to avoid or detect insurance fraud. A typical insurance fraud scheme is for a homeowner to use a storm or some weather event, and then make a claim against that storm and claim that their home was damaged in some way when the home was actually damaged in a previous storm and the damage happened before the homeowner lived there or before the homeowner was with the current insurance company. Another scenario may be that the homeowner damaged the home themselves in some way and decided to wait until the next storm event to make a claim. A couple of different ways to detect fraud may be to verify or look for the last day the area or neighborhood was flown with an AI mission and then compare that to their current AI recognition mission. Alternatively, if there were no historical records or historical mission, the carrier compares other homes around it to see if there is recent damage on adjacent roofs. This system may help by helping to identify whether or not the damage was from a current or historical storm, and may compare both the levels of damage and type of damage.

Insurance Compliance Verification: Another scenario for the AI Recognition system may be used by an insurance carrier to verify compliance or verify information on a newly insured customer. The insurance company may look at the most recent information about a property that's been flown and look at the condition of the property, how many buildings or structures are onsite, the number of assets and so forth. The carrier may also look at the condition of the roof of the building and so forth. If no information is available, the carrier could use or UAV/Aircraft crowdsourcing solution to send a request to have the insured or the insured property area to be flown and captured and then be able to verify. In one exemplary scenario, an insured party may claim that there are no bodies of water or outbuildings on their insured property, but upon verification, the property is shown to have two barns as well as a pond.

Pixel to Pattern Analysis: Another scenario for the AI recognition system would be once a UAV/Aircraft mission is completed, and analyzed and the results are available, another AI process may start to analyze all hail storm AI results within a 100-kilometer area. These systems may analyze, and look for areas that had multiple events, or area just adjacent to each other or a neighborhood nearby. These results may be used to create a rating system that rates the areas, based on frequency, level of damage, or some other metric that may be useful for the area. By way of non-limiting example, it may show the tendency for an area to get 3-inch hail within that grid. The area of interest could also be rated for characteristics such as, but not limited to, age or incidents of a particular type of structure.

X. Marketing and Sale of Data

The ability to scan neighborhoods using the AI recognition system allows evaluation of hail and wind losses, storm damage, age of roofs, and/or neighborhood damage as a whole. That data may be broken up and subdivided by individual home, neighborhood, grid, super grid area, county, state, and/or federal boundaries. This data may be sold and/or resold to insurance companies, contractors, manufacturers, distributors, governments, HOAs, real estate brokers, research companies, consumers, home owners, and/or other interested parties. The data may be sold directly, or in an alternate embodiment, a use may purchase access to all the above via an access subscription.

The ability to scan large areas using the AI recognition system also allows insurers to be able to evaluate hail and wind losses, storm damage, age of roofs, and area damage as a whole. The system may be able to generate estimates, claims documentation, measurements, and supporting reports for individual buildings or large areas for insurance carriers, contractors, federal, state and local governments, data resellers, and other users.

XI. UAV Crowd Sourcing

In instances where areas that need to be flown or a state has storm damage, but a pilot team is not in the area, the system uses crowd-sourcing to hire pilots to fly the areas. This will be in a bid/offer setting which posts areas/tasks to a region that need to be flown and added to a job board. Pilots or independent contractors will be able to rate area/task completion to ensure quality completions. PICs will be able to view the areas that need to be flown and then go and fly the areas. These independent contractors will use a custom version of the UAV application. This public based UAV application would be simplified for most parameters for the application and all needed info will be placed within the area/task. The PIC would then accept to fly the areas specified within the timeframe specified. Once all data was collected and verified the pilot would receive any money agreed-upon and released from escrow.

A sample process for wind processing would include the following steps:

Step 1001: Use wind/hail polygons from storm processing to load into a bid dashboard system.

Step 1002: Provide public based UAV application or website to allow public UAV pilots to bid on areas/tasks that need to be flown.

Step 1003: Task will provide all mission planning specs needed, polygon area, altitude, time of day, overlap, type of UAV, pixel density, when it should be completed, and any other information needed to plan and/or complete the task.

Step 1004: PIC will bid and will be verified.

Step 1005: Escrow account will be credited with accepted payment amount.

Step 1006: Pilot team flies mission with each pilot flying their own routes within the AOI mission as a whole.

Step 1007: Flight team completes and loads all completed photos into local, or cloud environment using Wi-Fi, cellular connections, or any other means for data transfer.

Step 1008: area/task complete and once verified, escrow is released.

XII. UAV 2D-3D Model Measurements

A detailed CAD model is generated through a common 3D intelligence platform. These platforms use photogrammetry methods to build a 2D/3D environment from imputed data. This is done by detection of roof structures, classification of edge types, accurate extraction of geometry and measurement of the entire roof. The automated measurements include the lengths of each roof edge and the pitch area for each roof plane. Computerized measurements are calculated by rounding off to the nearest centimeter. Manual or engineering measurements are rounded off to the nearest ¼ inch. The standard industrial measurement is measured to the nearest inch. Photogrammetry uses the same principle as that of the human eyes or 3D videos. This allows for objects to be seen and measured in 3D and to establish depth perception. The generation of points or lines with measurements and location detail using automated photogrammetric methods typically isn't as accurate as manually engineering, but close and is dependent on the camera sensor, quality and quantity of Ground Control points.

XIII. UAV Cameras and Swappable Components

As previously mentioned, a camera system is used to capture image data at a specific height or altitude. Each image may have a particular field-of-view showing the height and width on the distance on the ground or dimension. The optical sensor quality depends on the camera quality and focal length, pixel resolution, and the sensor width and height measured in millimeters. The collection is made up of a specific pixel density which may be achieved by changing the camera system, focal length, optical zoom, or by changing the altitude of the UAV. Generally, an identified classification requires a pixel density that can be achieved in several ways which still change, as mentioned above. They include; focal length, optical zoom, altitude or image resolution.

To capture images of the structure, the UAV may use a camera, sonar sensors, LiDAR sensors, infrared sensors, optical sensors, and radar sensors. An onboard processor and communication link are also included in the UAV to communicate with the controller and the link's cloud-based processing. The UAV also has a non-transitory computer-readable channel that is used to receive and store instructions. When these instructions are executed by the processor, they cause the UAV to perform a structural assessment.

A structural assessment may include a boustrophedonic scan containing the structure which is defined by geographical barriers, images captured within a first altitude range during a boustrophedonic flight pattern, and the determinants of distances to a surface for each geographical barrier which are defined by a bulk of potential vertical approaches Assessment and reporting of the UAV involve pointing out a structure on site, based on the identified location. Following a complete and step by step free flight pattern, the UAV may fly to the site and capture many high-resolution images, once a site has been identified. An unskilled operator may also capture some high-resolution images even as an amateur. A free flight pattern may be used to conduct an assessment of the UAV system. UAV assessment system helps to determine the number or kind of images to be captured. It also helps determine the required flight pattern.

When using an AI recognition system, the first step in utilizing the system is to define or know what type of data will be captured and analyzed. Depending on the purpose of the flight or the analysis, different configurations may be used. Within each data capture process, a different sensor configuration may be used. These configurations may include a large format camera, thermal camera, an infrared camera, and LiDAR data. Additionally, they may also include different types of sensors, multiple IR pulsed/emitted and sensed laser data, or a solid state or more of FOV broadcast of LiDAR data. IR lasers, for both pulsing and sensing, may be placed strategically across the sensing plane or imaging sensing surface depending on the need or purpose of capturing data. Many different scenarios as well as many different configurations may be used for each UAV/Aircraft mission or AI recognition task type.

The computer vision unit may be hot-swappable and interchangeable. This unit can be swapped out for a different configuration as needed. This swapping may be needed depending on the UAV/Aircraft mission parameters, or needs of the area/task, and in affect detached from the UAV/Aircraft structure and replaced with another computer vision unit that is more suitable for the UAV/Aircraft mission.

This swappable ability will also be available for the Artificial Intelligence Onboard system. The Onboard system will be an ECU, Electronic Control Unit. This ECU may have all the components for the AI Onboard built and embedded into 1 unit. This ECU type of board can be hot-swapped, or interchanged as needed depending on UAV/Aircraft mission, AI needs, or purchasable upgrades.

As part of the interchangeable environment, the AI Onboard/Imaging System may have a 4G/5G chipset with ECU that has capability to plug and connect the AI Onboard system to a cellular service using cellular providers. This connection will allow for the environment to connect directly to a network, and or cloud-based environment for storage of all data, post processing, meshing with other swarm drones, and other applications. These network connectivity abilities may be interchangeable and swappable as newer 5G, or later speeds become available.

A typical configuration for an imaging solution has body and at least one face surface. The body may be a reinforced polycarbonate structure that can hold many different sensors. Within this imaging body, all the components and onboard sensors may be housed for the computer vision systems. The face or front portion of the body may contain all imaging sensor emitters and receivers. It is important to note that the UAV/Aircraft may contain more than one imaging body to collect data in more than one direction at one time. For instance, the UAV/Aircraft may have an imaging body facing nadir, or directly down, and then it may have 1 or more imaging bodies facing at an oblique angle.

The primary component is a large format color (RGB) camera. This color camera may be within the range of a 25-megapixel to 150-megapixel camera. Depending on the need of the of the resulting output or capturing scenario, different megapixel resolutions may be used. The output resolution of the color camera may depend on the scenario and or granularity that is needed for the AI to process and compare to existing classifications or libraries. For instance, a 40-megapixel camera would work correctly for tab detection, or pothole detection and so forth. The resolution may not be high enough or as detailed enough to do a bridge inspection or to look for hail damage on a roof.

Another component for this imaging body may include a high-resolution radiometric thermal imaging sensor. This thermal imaging, depending on the scenario, can be used to look for heat loss in a building, or to look for absorption rates of a bridge or the emitting rate of a roof that has been either damaged or is old and does not contain the reflectivity properties of a new roof.

Another component of the imaging body is an infrared (IR) sensor. This lens may be used on a camera, and as the image is captured, it will show or indicate the IR laser locations directly within the FOV of the image. These points from the IR laser emitter may be synchronized with the infrared capture of the location. Since each camera output has the same FOV, the visual points may increase the geolocational accuracy of the captured data, and allow all data with the waypoint to be geo-referenced together as a whole.

Another component may be a number of lasers that will be used to annotate distances and measurements and locations into the resulting color image and or infrared image. These annotations are visible text, lines, or polygons used to show recognized features on the resulting data. These lasers may be used for many things, like UAV/Aircraft computer vision to allow for obstacle detection. These lasers may be used to allow the lens to autofocus as well by using a laser within the lens itself. With the location or strategic location of the IR lasers, they may indicate or triangulate locations within the FOV that can then be used to register additional locations and allow the captured data (color, thermal, or IR imagery) to be anchored to real-world coordinates. These lasers can also be used to visually indicate within the infrared or thermal image the visible location of the pulsed laser. These points can then be measured and used to build accuracy into the imaging system.

Another component of the imaging body may be a solid-state LiDAR sensor, a light detection/ranging system. This LiDAR sensor can capture emitted lasers or emitted light, and record the time it takes to return that emitted light in the receiver and then indicate or build a full scene of distances and elevations based on the sensing of the locations within the FOV. One the system has collected all the solid-state LiDAR data, all of those points or locations with x, y, and z values can be used to build a 3D scene. Each returned point can then be compared to each of its corresponding (nearby) pixels that exist within the three image sets and drape or create the 3D scene.

Each UAV/Aircraft mission has a certain coverage, or area footprint, this coverage after processing is analyzed, and indexed using geographic technology. As part of the backend system, as each new AI analyzed data is added, the data will be added to a super grid system. Where it is available, the system may use the US National Gird (USNG). This grid creates kilometer, and 10-kilometer grids across the United States. The AI system may create its own national, or regional grid if needed to support processing. This super grid system will take each part of the post processing for a mission, or area, and register it within this grid system and index it. With the registration, a background AI will process results of onboard, or back-end processing AI. The Pixel-to-pattern AI will then compare adjacent, temporal, or nearby AI results. This AI may include traffic patterns, Infrastructure, past storm coverage, climate change data, GIS data, hail damage data, wind damage data, demographics data, census data, and any other data. The results of the Pixel-to-Pattern AI will provide comparison for change detection, anomaly detection (depending on data, may be cracks, age, potholes, and so on), and/or trends for grid. These comparisons or trends can be viewed, or analyzed as granular, or as coarse as needed, such as, but not limited to, 100-meter, 1 kilometer, 10 kilometer, or 100 kilometers. With the ability to run the Pixel-to-Pattern AI on the results of other data, and trends, a predictive model for AI can also be built to provide predictive results for all the areas mentioned above. As part of the trend and predictive results, several rating systems may be created. One of these, Roof Life Expectancy, takes into account the reflectivity, coarseness, and age, and then builds a rating/index for areas within those sub and super grids and provides a rating system. This rating system can then be used to drive manufacturing needs, supply chain satellite distribution locations, insurance rates, and other applications.

Each configuration of the imaging body has its own strengths and weaknesses. Depending on the field scenario or need, a different configuration may be used to optimize the onboard processing, and produce the highest quality results. For example, an imaging body may use different combinations, numbers, and configurations of an IR sensor, a large format color camera, Solid State LiDAR, and/or a thermal sensor. The IR sensor is used for reflectivity, capturing of lasers for measurements, and triangulation of lasers to use to register all photos together with affine transformation or level-arm or boresight methods. The large format color camera is used for capturing data for 2D, and 3D data to be used for models, background for measurements, and other applications requiring images. A 25-150 Mp camera may be used for high quality resolution for hail detection or measurements. It may have a large pixel density and/or contain 3-4 laser points for measurement and triangulation. The solid-state LiDAR is used to broadcast over the whole FOV and then drape all captured imagery. The thermal sensor is used to capture reflectivity, roughness, or heat of recognized features, and may also be used to capture laser locations.

Figure 1B:
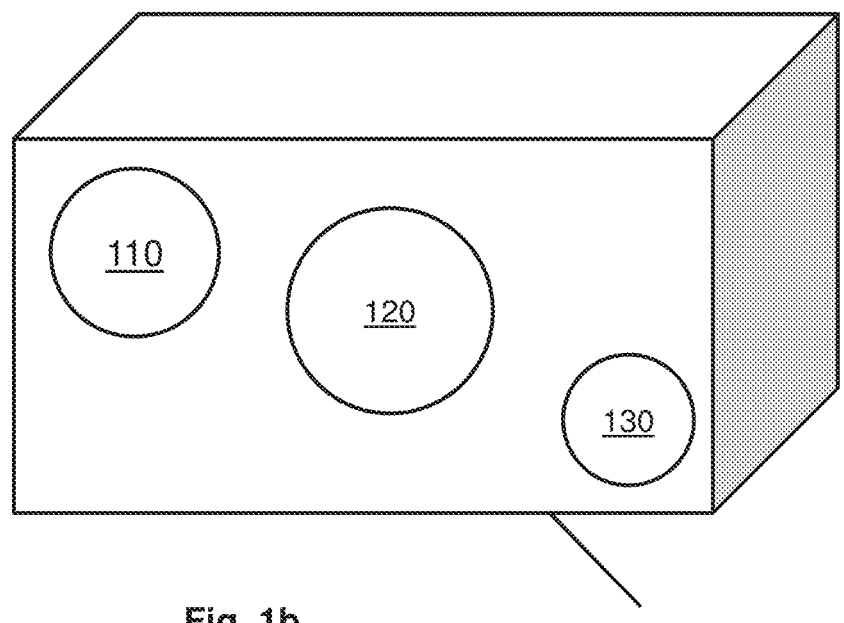
Figure 1C:
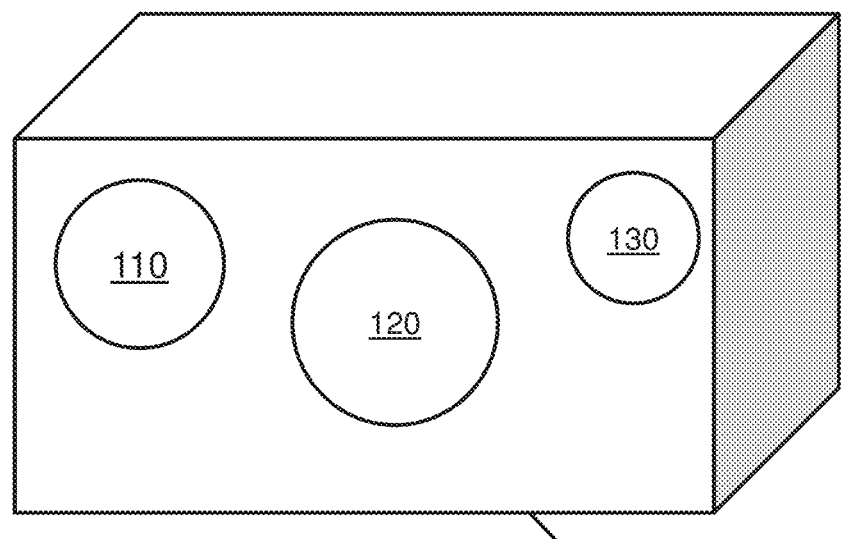
Figure 1D:
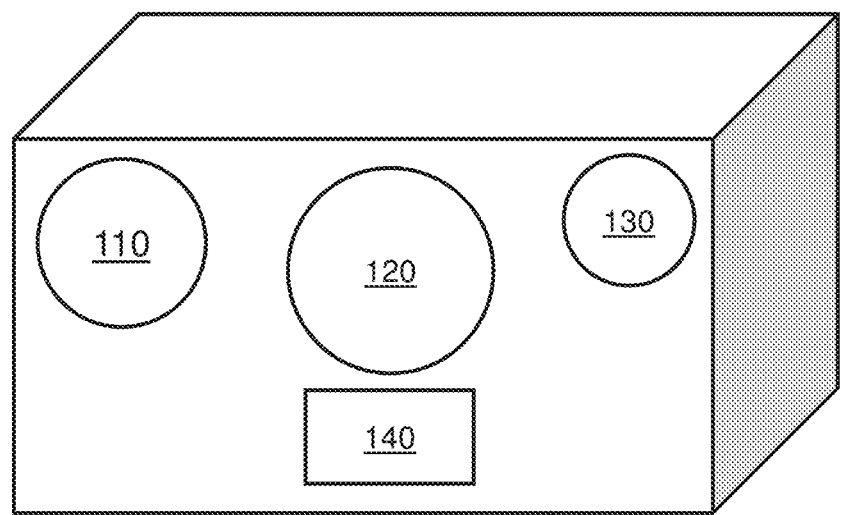
Figure 1E:
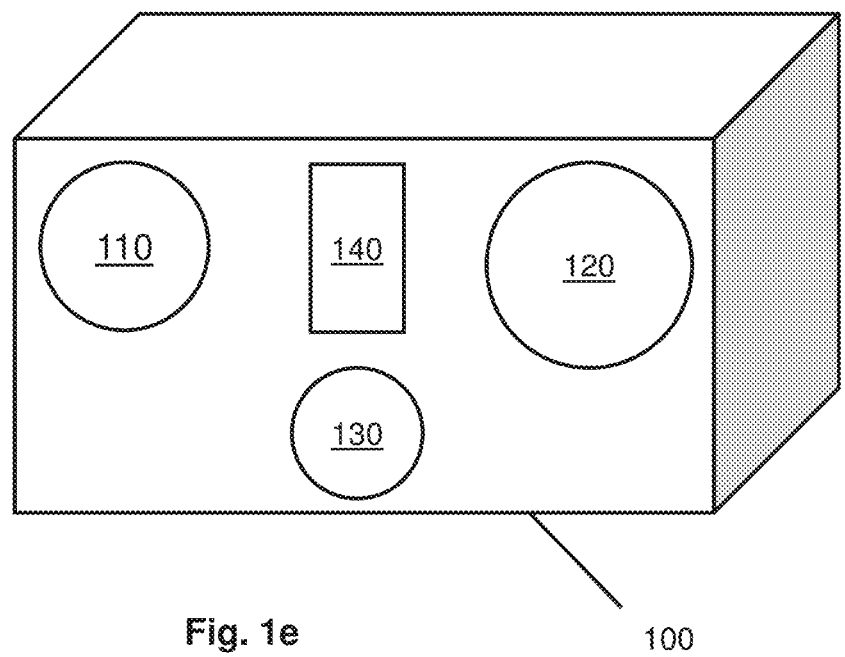
Figure 1F:
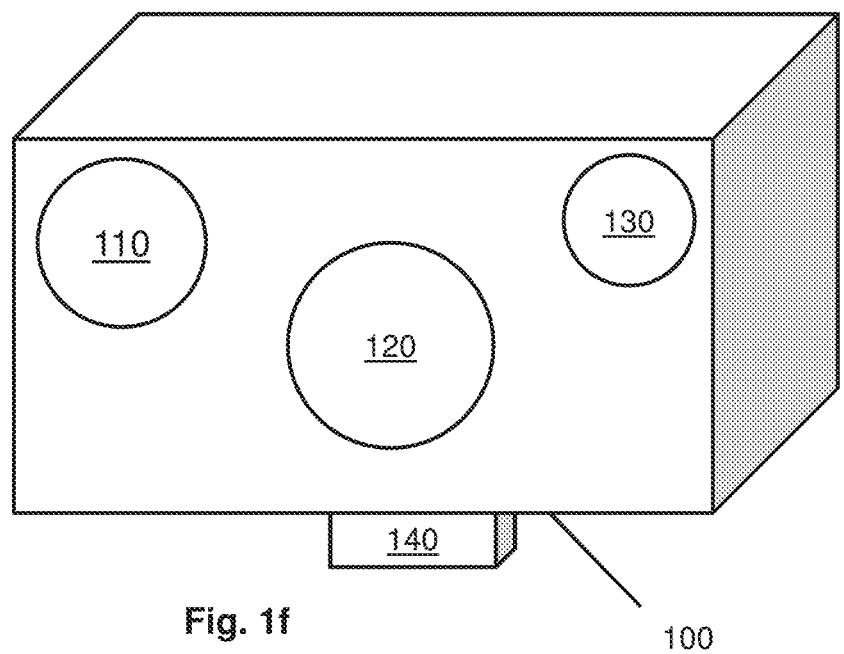

As can be seen in FIGS. 1a-1c, one imaging body 100 may use only an IR sensor 110, large format color camera 120, and a thermal sensor 130. As can be seen in FIGS. 1d-1f, another imaging body 100 may use an IR sensor 110, a large format color camera 120, a Solid-State LiDAR 140, and a thermal sensor 130. As can be seen in FIGS. 1a-1f, imaging body combinations using the same numbers and types of sensors may still have different placements and/or orientations of the sensors.

Other sensors may also be used, such as, but not limited to, one or more of the following sensors: optical, sonar, ultraviolet, radar, color thermal imaging, Bluetooth, WiFi, air quality ($NH_3$, $NO_x$, alcohol, benzene, smoke, $CO_2$ ethanol, hydrogen and iso-butane), humidity, and temperature. The UAV itself may include proximity sensors using any of the above-listed sensing modalities.

Figure 2:
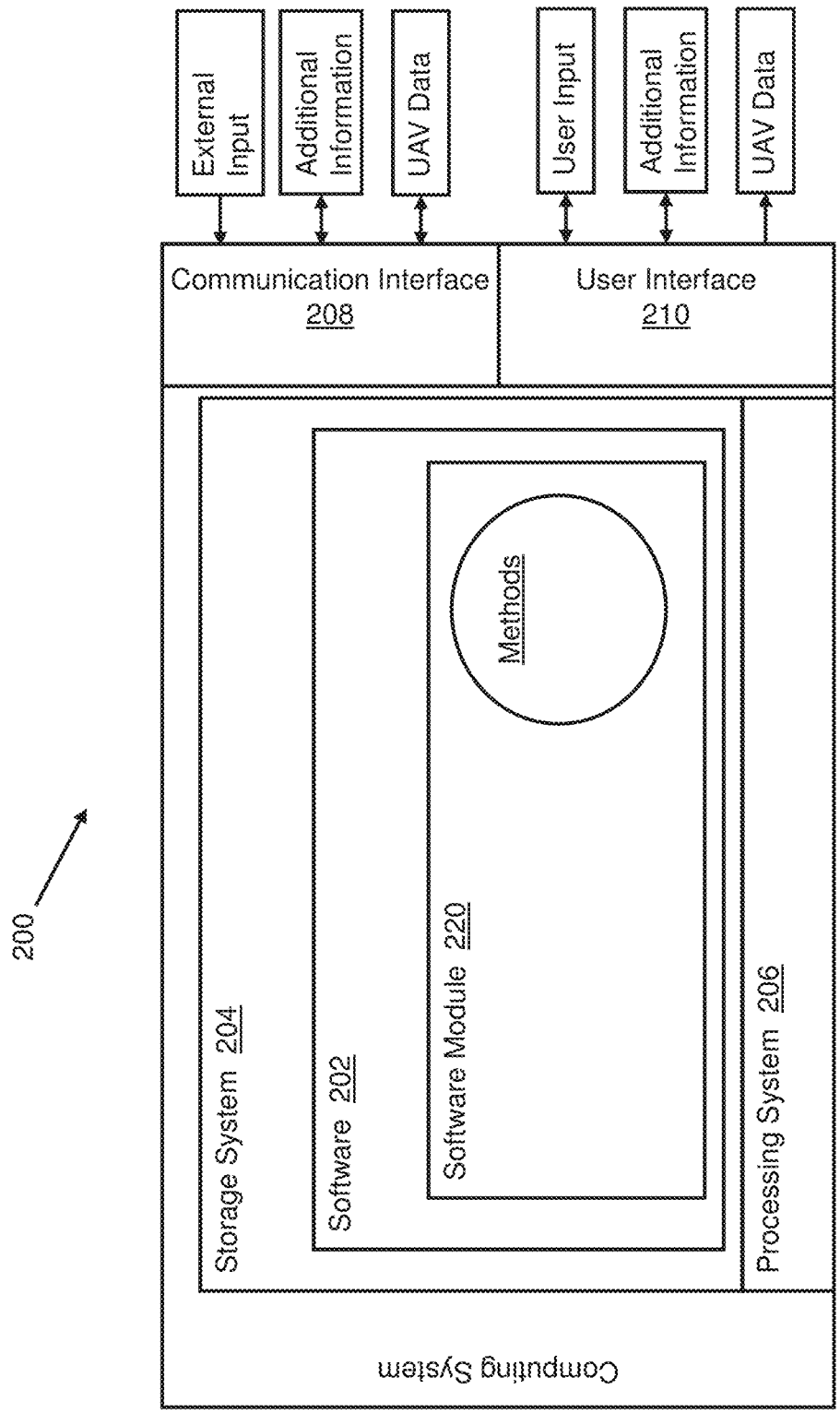
FIG. 2 illustrates a block diagram of an exemplary embodiment of a computing system which may be used by any of the methods and in any of the UAV systems listed herein.

FIG. 2 illustrates a block diagram of an exemplary embodiment of a computing system 200 which may be used by any of the above methods and in any of the above UAV systems. The computing system 200 may be used to implement embodiments of portions of the UAV system, or in carrying out embodiments of the methods.

The computing system 200 is generally a computing system that includes at least one processing system 206, at least one storage system 204, software 202, at least one communication interface 208, and at least one user interface 210. The processing system 206 loads and executes software 202 from the storage system 204, including a software module 220. When executed by computing system 200, software module 220 directs the processing system 206 to operate as described herein in further detail in accordance with the above methods.

The computing system 200 includes a software module 220 for executing methods for generating storm estimates, wind corrections, UAV mission analysis, AI learning and processing, UAV imagery processing, process verification, network/mesh uploading and downloading, marketing and sale of data, crowd sourcing, and model measurements. Although computing system 200 as depicted in FIG. 2 includes one software module 220 in the present example, it should be understood that more modules could provide the same operation. Similarly, while the description as provided herein refers to a computing system 200 and a processing system 206, it is to be recognized that implementations of such systems can be performed using one or more processors, which may be communicatively connected, and such implementations are considered to be within the scope of the description. It is also contemplated that these components of computing system 200 may be operating in a number of physical locations, such as, but not limited to, at least one server, at least one application-enabled user controller, and at least one UAV.

The processing system 206 can comprise a microprocessor and other circuitry that retrieves and executes software 202 from storage system 204. The processing system 206 can be implemented within a single processing device but can also be distributed across multiple processing devices or sub-systems that cooperate in existing program instructions. Examples of processing systems 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other information. The storage system 204 can be implemented as a single storage device but may also be implemented across multiple storage devices or sub-systems. The storage system 204 can further include additional elements, such as a server or a controller capable of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to computing system 200.

As described in further detail herein, computing system 200 receives and transmits data through communication interface 208. The data can include any of the above data derived from external sources, UAV sensor data either pre- or post-processing, products of such processing, and/or any other data that may pertain to any of the above methods. In embodiments, the communication interface 208 also operates to send and/or receive information, such as, but not limited to, additional information to/from other systems to which computing system 200 is communicatively connected, including, but not limited to, another UAV system or an external computing and/or storage system.

The user interface 210 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display one or more of the UAV data or mission area, UAV flight path, or another interface further associated with embodiments of the system and method as disclosed herein. Speakers, printers, haptic devices and other types of output devices may also be included in the user interface 210. Users can communicate with computing system 200 through the user interface 210 in order to view the UAV data or mission area, UAV flight path, and/or derived and/or calculated data, to enter or receive any other data or additional information, or any number of other tasks the user may want to complete with computing system 200.

All combinations of method steps as used herein can be performed in any order, unless otherwise specified or clearly implied to the contrary by the context in which the referenced combination is made. Method steps may be repeated, occur out of the listed order, or be combined, whether within the same process or another process.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A method for generating a storm estimate, comprising:
    retrieving raw weather data from a radar source, the raw weather data having a high resolution;
    obtaining a maximum estimate size of hail (MESH) from the raw weather data;
    correlating a MESH above a given threshold with a radar geographical location and a time span;
    retrieving at least one radar weather data pixel within a given hail radius of the radar geographical location and the given time span;
    filtering the at least one radar weather data pixel to remove noise and clutter;
    retrieving atmospheric level data for the locations of atmospheric temperatures of 0° C. and −20° C. for the at least one radar weather data pixel at given intervals during the time span;
    calculating at least one new MESH using the atmospheric level data and the at least one radar weather data pixel;
    correlating the at least one new MESH with a hail geographical location corresponding to the at least one radar weather data pixel;
    creating an overlay of the at least one new MESH on a map corresponding to the hail geographical location, wherein the overlay is in the form of a hail polygon corresponding to the at least one radar weather data pixel; and
    designating at least one hail polygon having at least one new MESH above a given threshold as a mission area for at least one unmanned aerial vehicle (UAV).

2. The method of claim 1, further comprising correlating polygons having at least one new MESH above a given threshold with a database of customer locations.

3. The method of claim 1, wherein the at least one radar weather data pixel is filtered to remove storm reflectivity of under 35 dBZ.

4. A method for generating a storm estimate, comprising:
    retrieving raw weather data from a radar source, the raw weather data having a high resolution;
    obtaining a maximum estimate size of hail (MESH) from the raw weather data;
    correlating a MESH above a given threshold with a radar geographical location and a time span;
    retrieving at least one radar weather data pixel within a given hail radius of the radar geographical location and the given time span:
    filtering the at least one radar weather data pixel to remove noise and clutter;

retrieving atmospheric level data for the locations of atmospheric temperatures of 0° C. and −20° C. for the at least one radar weather data pixel at given intervals during the time span;

calculating at least one new MESH using the atmospheric level data and the at least one radar weather data pixel;

correlating the at least one new MESH with a hail geographical location corresponding to the at least one radar weather data pixel;

acquiring wind velocity data for at least one radar weather data pixel;

filtering out any wind velocity data below at least one given wind threshold;

calculating a wind distance between the at least one radar weather data pixel and the radar geographical location;

calculating a beam height and a beam azimuth of a radar beam emanating from the radar geographical location at the at least one radar weather data pixel;

calculating at least one wind velocity and at least one wind direction from a radar wind speed and a radar wind direction, wherein the component of the radar beam in the radar wind direction and the height of the radar beam are used to calculate the at least one wind velocity and at least one wind direction; correlating the at least one wind velocity and at least one wind direction with a wind geographical location corresponding to the at least one radar weather data pixel; and creating an overlay of the at least one wind velocity and at least one wind direction on a map corresponding to the wind geographical location.

5. The method of claim 4, wherein the overlay is in the form of a wind polygon corresponding to the at least one radar weather data pixel.

6. The method of claim 5, further comprising designating at least one wind polygon having at least one wind velocity and at least one wind direction above a given threshold as a mission area for at least one UAV.

7. A system for generating a storm estimate, comprising:
a processor; and
a non-transitory computer readable medium programmed with computer readable code that upon execution by the processor causes the processor to execute a method for generating a storm estimate, comprising:
retrieving raw weather data from a radar source, the raw weather data having a high resolution;
obtaining a maximum estimate size of hail (MESH) from the raw weather data;
correlating a MESH above a given threshold with a radar geographical location and a time span;
retrieving at least one radar weather data pixel within a given hail radius of the radar geographical location and the given time span;
filtering the at least one radar weather data pixel to remove noise and clutter;
retrieving atmospheric level data for the locations of atmospheric temperatures of 0° C. and −20° C. for the at least one radar weather data pixel at given intervals during the time span;
calculating at least one new MESH using the atmospheric level data and the at least one radar weather data pixel;
correlating the at least one new MESH with a hail geographical location corresponding to the at least one radar weather data pixel; and
creating an overlay of the at least one new MESH on a map corresponding to the hail geographical location, wherein the overlay is in the form of at least one hail polygon corresponding to the at least one radar weather data pixel; and
designating at least one hail polygon having at least one new MESH above a given threshold as a mission area for at least one unmanned aerial vehicle (UAV).

8. The system of claim 7, further comprising at least one database containing the map and the at least one new MESH.

9. The system of claim 8, further comprising at least one user interface operably connected to the at least one database and receiving the overlay of the at least one new MESH on the map, the at least one user interface operably and controllably connected to the at least one UAV, the at least one UAV having at least one UAV sensor connected thereto.

10. The system of claim 9, further comprising a graphical user interface (GUI) displayed on the user interface, the GUI displaying at least one user-editable flight path for the at least one UAV or a plurality of user-selectable flight paths for the at least one UAV.

11. The system of claim 10, wherein each user-selectable flight path comprises at least one of a two-dimensional flight path at a given altitude or a three-dimensional flight path at a plurality of altitudes.

12. The system of claim 10, wherein the plurality of user-selectable flight paths traverse the at least one hail polygon without overlapping.

13. The system of claim 10, the GUI further comprising at least one user-selectable sensor profile comprising at least one sensor setting selected from the group consisting of: sensor in use, sensor orientation, and sensor recording interval.

14. The system of claim 10, the GUI further comprising at least one user-selectable UAV operating height.

15. The system of claim 10, further comprising at least one sensor data file comprising at least one reading taken by the at least one UAV sensor while the UAV travels along the at least one user-editable flight path or one of the plurality of user-selectable flight paths.

16. The system of claim 15, wherein the at least one sensor file further comprises at least one coordinate record in the sensor file or in the sensor file metadata, wherein the coordinate record is based on the orientation of the at least one UAV sensor and the location of the UAV when the sensor record was made.

17. The system of claim 15, further comprising a sensor database containing a plurality of sensor data files.

18. The system of claim 17, wherein each of the plurality of sensor data files is correlated to a specific sensor geographical location on the map based on at least one coordinate record in the sensor file or in the sensor file metadata.

19. The system of claim 17, wherein the non-transitory computer readable medium is programmed with computer readable code that upon execution by the processor causes the processor to execute a file tagging method comprising comparing each of the plurality of sensor data files to at least one tag criterion and updating the sensor file metadata with a tag if the at least one tag criterion is met.

20. The system of claim 9, further comprising a plurality of ground control points (GCPs) detectable by the at least one UAV sensor, wherein each GCP is correlated with a quasi-unique GCP geographical location.

* * * * *